United States Patent
Kpodzo et al.

(10) Patent No.: US 9,831,901 B2
(45) Date of Patent: *Nov. 28, 2017

(54) REMOTE INTERFERENCE CANCELLATION FOR COMMUNICATIONS SYSTEMS

(71) Applicant: L-3 Communications Corporation, New York, NY (US)

(72) Inventors: Elias Bonaventure Kpodzo, Franklin Park, NJ (US); Robert Holland, Moorestown, NJ (US); Paul Dourbal, Princeton Junction, NJ (US); Yanhua Deng, Gainesville, FL (US); Paul Prucnal, Princeton, NJ (US); Andrew McCandless, Baton Rouge, LA (US)

(73) Assignee: L3 TECHNOLOGIES, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,898

(22) Filed: Apr. 26, 2016

(65) Prior Publication Data

US 2016/0241354 A1     Aug. 18, 2016

Related U.S. Application Data

(63) Continuation of application No. 13/899,529, filed on May 21, 2013, now Pat. No. 9,344,125.

(Continued)

(51) Int. Cl.
*H04K 3/00* (2006.01)
*H04B 1/10* (2006.01)
(Continued)

(52) U.S. Cl.
CPC .............. *H04B 1/1027* (2013.01); *H04B 1/10* (2013.01); *H04B 1/109* (2013.01); *H04B 10/00* (2013.01);
(Continued)

(58) Field of Classification Search
CPC ...... H04J 14/02; H04B 10/505; H04B 10/506; H04B 1/1036; H04B 10/2575; H04B 10/50593

See application file for complete search history.

(56) References Cited

U.S. PATENT DOCUMENTS

| 5,247,309 A | 9/1993 | Reich |
| 6,141,393 A | 10/2000 | Thomas et al. |

(Continued)

FOREIGN PATENT DOCUMENTS

CN          101404509 A        4/2009

OTHER PUBLICATIONS

"RFI/EMI Current Probes and Injection Probes", Solar Electronics Company, pp. 33-36.

(Continued)

*Primary Examiner* — Shuwang Liu
*Assistant Examiner* — Sung Ahn
(74) *Attorney, Agent, or Firm* — Condo Roccia Koptiw LLP

(57) ABSTRACT

An interference cancellation system (ICS) may be used with a communication system to prevent or minimize interference from one or more sources. The ICS may receive radio frequency (RF) signals comprised of one or more signals of interest (SOI) and multiple interfering signals. An interference estimation processor (IEP) may be used to estimate the one or more interfering signals. The interfering signals may be estimated using spatial and/or time diversity, which may be combined with statistical methods. The estimated interfering signals may be sent to the ICS, which may use the estimated interference signal to cancel the interference and output the SOI.

13 Claims, 26 Drawing Sheets

Related U.S. Application Data

(60) Provisional application No. 61/649,715, filed on May 21, 2012, provisional application No. 61/649,856, filed on May 21, 2012, provisional application No. 61/649,843, filed on May 21, 2012.

(51) Int. Cl.

| | |
|---|---|
| *H04B 10/00* | (2013.01) |
| *H04B 17/318* | (2015.01) |
| *H04B 17/336* | (2015.01) |
| *H04L 12/26* | (2006.01) |
| *H04B 10/079* | (2013.01) |
| *H04B 10/2507* | (2013.01) |
| *H04B 10/2575* | (2013.01) |

(52) U.S. Cl.
CPC ... *H04B 10/07955* (2013.01); *H04B 10/2507* (2013.01); *H04B 10/2575* (2013.01); *H04B 17/318* (2015.01); *H04B 17/336* (2015.01); *H04K 3/20* (2013.01); *H04K 3/228* (2013.01); *H04L 43/16* (2013.01); *H04B 2210/006* (2013.01)

(56) References Cited

U.S. PATENT DOCUMENTS

| | | | |
|---|---|---|---|
| 6,525,682 | B2 | 2/2003 | Yap et al. |
| 6,614,806 | B1 | 9/2003 | Nanni |
| 7,035,550 | B2 | 4/2006 | Prucnal et al. |
| 7,068,894 | B2 | 6/2006 | Prucnal et al. |
| 7,856,184 | B2 | 12/2010 | Li |
| 8,081,946 | B2 | 12/2011 | Fudge |
| 8,103,175 | B1 | 1/2012 | Kowalczyk et al. |
| 8,682,170 | B2 | 3/2014 | Prucnal |
| 9,185,674 | B2 | 11/2015 | Sauer |
| 9,344,125 | B2* | 5/2016 | Kpodzo ............... H04B 1/1027 |
| 9,444,502 | B2 | 9/2016 | Kpodzo |
| 2001/0020908 | A1 | 9/2001 | Prucnal |
| 2002/0012495 | A1 | 1/2002 | Sasai et al. |
| 2003/0121056 | A1 | 6/2003 | Sorenson et al. |
| 2004/0037524 | A1 | 2/2004 | Shahar et al. |
| 2004/0037525 | A1 | 2/2004 | Shahar et al. |
| 2004/0085612 | A1 | 5/2004 | Livingston et al. |
| 2004/0146237 | A1 | 7/2004 | Taylor et al. |
| 2004/0208626 | A1 | 10/2004 | Nishimura et al. |
| 2004/0208636 | A1 | 10/2004 | Reynolds et al. |
| 2004/0213508 | A1 | 10/2004 | Shahar et al. |
| 2005/0033966 | A1 | 2/2005 | Johnson, Jr. |
| 2005/0105847 | A1 | 5/2005 | Prucnal et al. |
| 2006/0161055 | A1 | 7/2006 | Pewzner et al. |
| 2007/0237270 | A1 | 10/2007 | Mezer et al. |
| 2008/0033681 | A1* | 2/2008 | Ziomek ................ G01R 31/302 702/108 |
| 2008/0212968 | A1* | 9/2008 | Lindop ............... H04B 10/2575 398/91 |
| 2009/0263137 | A1 | 10/2009 | Hossein-Zadeh et al. |
| 2010/0098411 | A1 | 4/2010 | Nakashima et al. |
| 2011/0129026 | A1 | 6/2011 | Um et al. |
| 2011/0170879 | A1 | 7/2011 | Lin et al. |
| 2011/0287720 | A1* | 11/2011 | Cox ..................... H04B 1/525 455/63.1 |
| 2012/0052892 | A1* | 3/2012 | Braithwaite ........... H04B 1/525 455/501 |
| 2012/0201173 | A1* | 8/2012 | Jain ..................... H04B 1/525 370/277 |
| 2012/0251031 | A1 | 10/2012 | Suarez et al. |
| 2012/0294608 | A1 | 11/2012 | Prucnal |
| 2013/0308940 | A1 | 11/2013 | Kpodzo et al. |
| 2014/0218240 | A1 | 8/2014 | Kpodzo et al. |
| 2014/0282783 | A1 | 9/2014 | Totten et al. |

OTHER PUBLICATIONS

Akajoki, et al., "Model Optical Transmitters with a Circuit Simulator", Microwaves & RF, vol. 44, Apr. 15, 2005, 92 pages.

Biedka et al., "Smart Antenna for Handsets", Bradley Department of Electrical and Computer Engineering, Virginia Polytechnic Institute and State University, Blacksburg, VA 24061-0111, Aug. 2, 2000, 5 pages.

Brahimi et al., "CAD of Microwave Optical Systems for Time & Frequency Applications", LAAS-CNRS, The European Forum for Time and Frequency 08, Version 1, Toulouse, France, Apr. 29, 2008, 5 pages.

Choi et al., "Achieving Single Channel, Full Duplex Wireless Communication", In Proceedings of the Sixteenth Annual International Conference on Mobile Computing and Networking, MobiCom'10, ACM, Sep. 20-24, 2010, pp. 1-12.

Choi et al., "The Effects of Co-Channel Interference on Spatial Diversity Techniques", IEEE Wireless Communications and Networking Conference, Mar. 11-15, 2007, pp. 1938-1943.

Donlan, "Ultra-Wideband Narrowband Interference Cancellation and Channel Modeling for Communications", Thesis, Electrical and Computer Engineering, Jan. 31, 2005, 119 pages.

Gheorma et al., "RF Photonic Techniques for Same Frequency Simultaneous Duplex Antenna Operation", Photonics Technology Letters, vol. 19, No. 13, Jul. 1, 2007, pp. 1014-1016.

Gollakota et al., "ZigZag Decoding: Combating Hidden Terminals in Wireless Networks", In Proceedings of the ACM SIGCOMM 2008 Conference on Data Communication, Aug. 17-22, 2008, pp. 159-170.

Halperin et al., "Taking the Sting out of Carrier Sense: Interference Cancellation for Wireless LANs", In Proceedings of the 14th ACM international conference on Mobile computing and networking, Sep. 8-12, 2008, 12 pages.

Intersil, "Active Isolation Enhancer and Interference Canceller", Qhx220 narrowband noise canceller, Oct. 20, 2009, pp. 1-19.

Jain et al., "Practical, Real-time, Full-Duplex Wireless", In Proceedings of the 17th Annual International Conference on Mobile Computing and Networking, Mobicom, Sep. 19-23, 2011, 12 Pages.

Johnson et al., "Interferometric Modulators for an Adaptive Nulling System", SPIE Analog Photonics, vol. 1790, Feb. 26, 1993, pp. 50-54.

Kay, Steven M., "Fundamentals of Statistical Signal Processing: Estimation Theory", Upper Saddle River NJ: Prentice Hall, vol. 1, 1993, 589 pages.

Kim et al., "Adaptive Feedback Interference Cancellation System (AF-ICS)", Microwave Symposium Digest, IEEE MTT-S International, vol. 1, Jun. 8-13, 2003, pp. 627-630.

Naglich et al., "Tunable, Substrate Integrated, High Q Filter Cascade for High Isolation", Microwave Symposium Digest (MTT), 2010 IEEE MTT-S International, May 23-28, 2010, pp. 1468-1471.

Nightingale et al., "An Eight Channel Interference Cancellation System", Microwave Symposium Digest, IEEE MTT-S International, Jun. 11-16, 2006, pp. 914-917.

Raghavan, et al., "Analysis and Design of an Interference Canceller for Collocated Radios", IEEE Transactions on Microwave Theory and Techniques, vol. 53, No. 11, Nov. 2005, pp. 3498-3508.

Reines et al., "Compact Low-Loss Tunable X-Band Bandstop Filter with Miniature RF-MEMS Switches", IEEE Trans. Microwave Theory and Techniques, vol. 58, No. 7, Jul. 2010, pp. 1887-1895.

Sonnenschein et al., "A Design for an Electro-Optic Implementation of a Wideband Nulling System", IEEE, MIT Lincoln Lab., Tech. Rep. 887, vol. 2, Sep. 30-Oct. 3, 1990, pp. 742-748.

Stutzman et al., "Recent Results From Smart Antenna Experiments-Base Station and Handheld Terminals", IEEE, Radio and Wireless Conference, RAWCON 2000, Sep. 10-13, 2000, pp. 139-142.

Suarez et al., "Incoherent Method of Optical Interference Cancellation for Radio Frequency Communications", IEEE Journal of Quantum Electronics, vol. 45, No. 4, Apr. 2009, pp. 402-408.

Suarez et al., "Methods of Feedback Control for Adaptive Counter-Phase Optical Interference Cancellation", IEEE Transactions on Instrumentation and Measurement, vol. 60, No. 2, Feb. 2011, pp. 598-607.

(56) References Cited

OTHER PUBLICATIONS

Suarez et al., "System Level Performance and Characterization of Counter-Phase Optical Interference Cancellation", IEEE, Journal of Lightwave Technology, vol. 28, No. 12, Jun. 15, 2010, pp. 1821-1831.
Suarez, John, "Electro-Optic Counter-Phase Modulation for Broadband Radio-Frequency Interference Cancellation", Dissertation Presented to the Faculty of Princeton University, Apr. 2012, 224 pages.
Ward et al., "Design and Fabrication of a Multichannel Adaptive Optical Processor (MADOP)", In-House Report, RL-TR-92-333, Dec. 1992, 59 pages.

\* cited by examiner

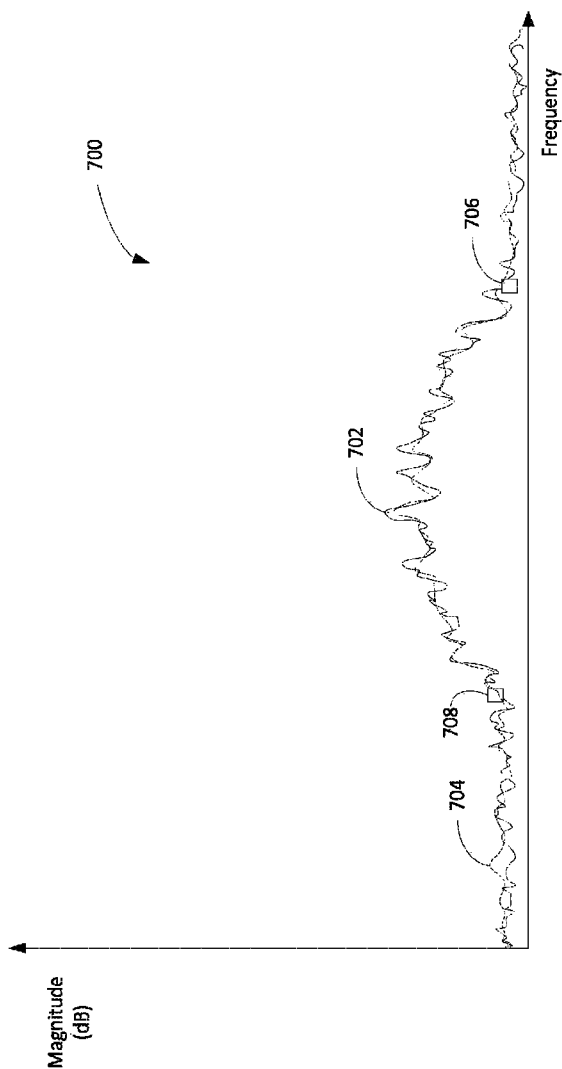

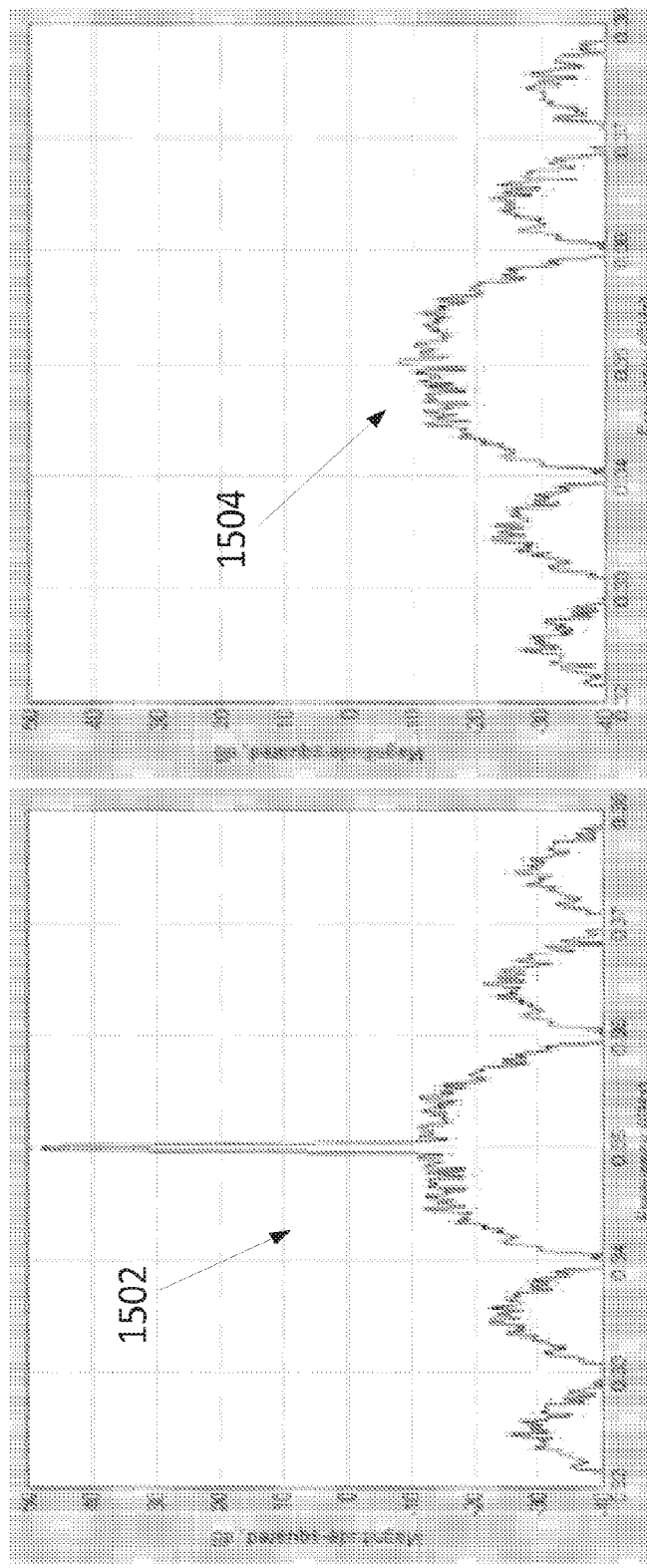

Output Signal After Cancellation

Input Signal to the IEP

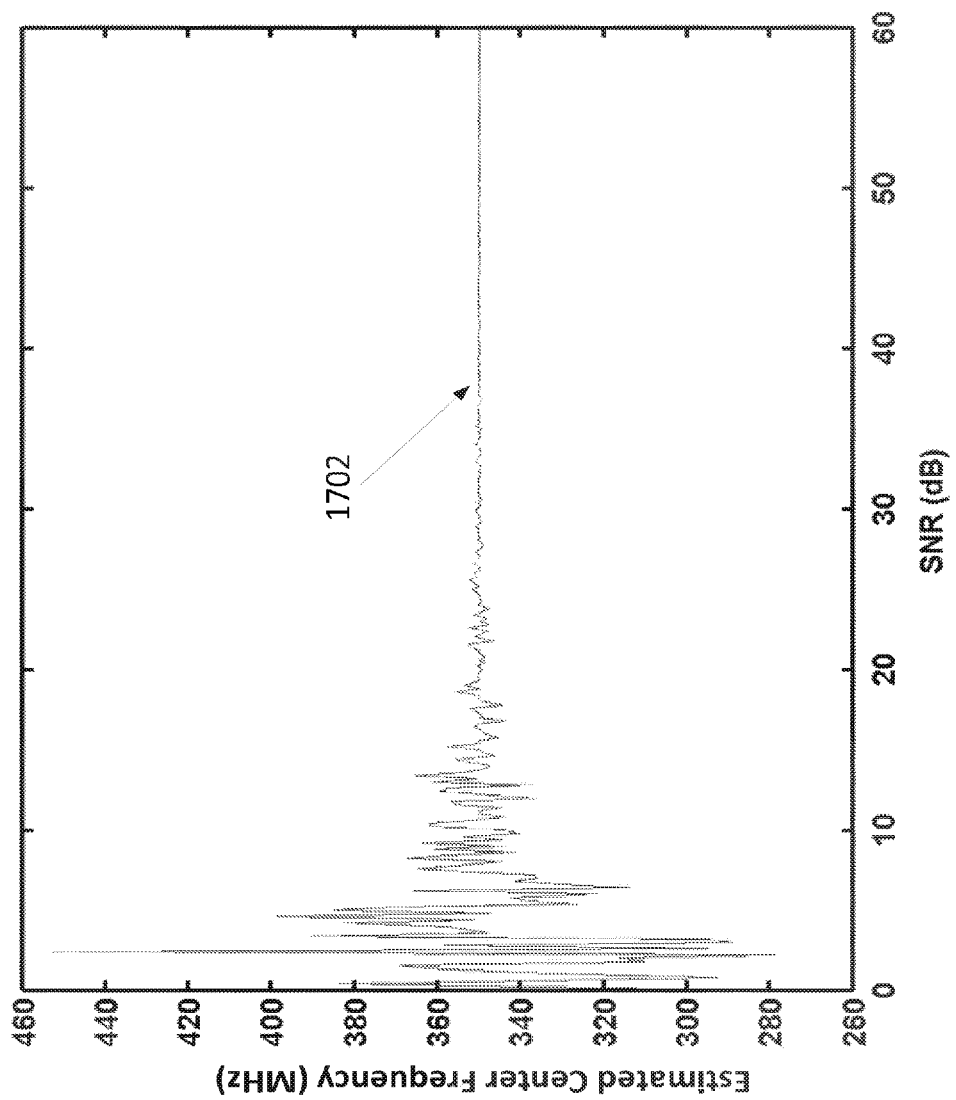

REMOTE INTERFERENCE CANCELLATION FOR COMMUNICATIONS SYSTEMS

CROSS-REFERENCE TO RELATED APPLICATIONS

This application is a continuation of U.S. patent application Ser. No. 13/899,529, filed May 21, 2013, which claims the benefit of U.S. Provisional Patent Application No. 61/649,856, filed on May 21, 2012, U.S. Provisional Patent Application No. 61/649,715, filed May 21, 2012, and U.S. Provisional Patent Application No. 61/649,843, filed May 21, 2012, the contents of which are incorporated by reference herein in their entirety. This application may include subject matter that is related to subject matter included in U.S. patent application Ser. No. 13/899,368, filed May 21, 2013 and U.S. patent application Ser. No. 13/899,505, filed May 21, 2013.

STATEMENT OF GOVERNMENT SUPPORT

This invention was made with government support under SBIR N66001-12-P-5105 awarded by the Small Business Administration. The government has certain rights in the invention.

BACKGROUND

The radio spectrum is crowded due to the growth in the demand for radio frequency (RF) applications. Multiple wireless communications systems may be allocated in close proximity or in the same radio spectrum. For example, one or more RF jammers or other wireless communications systems may be in close proximity to, and cause interference at, a transceiver attempting to receive a signal from one of the communications systems. Optimum performance of a radio transceiver may be difficult to achieve due to such interference. Narrowband interference of a wideband signal may be challenging and important to efficient spectrum use.

SUMMARY

Systems and methods are described herein for a broadband interference cancellation system (ICS) that may be used with various communications systems to prevent or minimize interference from one or more remote and/or unknown sources. For example, a signal of interest (SOI) and one or more interfering signals may be received at an interference cancellation system (ICS). An interference estimation processor (IEP) may be used to estimate the one or more interfering signals. For example, the interfering signals may be estimated using spatial and/or time diversity, which may be combined with statistical methods for example. The estimated interfering signals may be sent to the ICS, which may use these estimates to cancel the interference and output the SOI.

According to another example embodiment, multiple interference modules may be implemented by the ICS to handle various types of interference.

The embodiments described in the Summary are provided as examples, and are in no way limiting on the scope of the embodiments described elsewhere herein.

BRIEF DESCRIPTION OF DRAWINGS

FIGS. 7A, 7B, and 7C are graphs that show example RF output power spectrums.

FIGS. 15A and 15B are graphs that show an example signal input into the IEP and a signal output after cancellation.

FIG. 17 is a graph that shows an estimated center frequency for a signal-to-noise ratio (SNR).

DETAILED DESCRIPTION

A remote broadband interference cancellation system (ICS) may be used with various communications systems to prevent or minimize interference from remote systems. For example, the ICS may be used to enable receipt of wireless communications by a transceiver in proximity to other wireless communications that may be causing interference.

RF jamming may be used as a defense to protect military vehicles from mines and/or Improvised Explosive Devices (IEDs), such as those detonated remotely for example. RF jamming may be used to disrupt enemy communications. To effectively jam hostile communications channels, the jammers may transmit high power, broad-band signals in the same bands that may be used for friendly communications.

While providing protection by blocking enemy signals, jammers may saturate the electromagnetic spectrum and interfere with friendly signals being transmitted or received within a wireless range of the jammers. Embodiments are described herein that enable compatibility between jammers/interferers and other communications equipment. While the embodiments described herein may be described with reference to jammers and/or other military communications equipment, they may be implemented in any communication system to minimize or cancel interference at a transceiver.

Communications equipment and jammers may work in harmony even when the systems are operating at the same frequency. An ICS may be seamlessly integrated with existing field equipment (e.g., jammers/interferers and/or radio transceivers) for communication system deployment in the field, in the air, on ships, on submarines, or in any other area in which wireless communications equipment may be implemented. The ICS may be used to enable the communications equipment to transmit and/or receive information via one or more wireless signals while a jammer may cause interference. The ICS may cancel the interfering signals and allowing the data being transmitted to be properly received.

An optical ICS that may receive one or more signals of interest (SOIs) and one or more interfering signals and may perform cancellation of the interfering signals to allow the SOI to be properly communicated. The optical ICS may connect to communications equipment and/or jammers, which may be in service. The optical ICS may identify remote jammers/interferers to reduce jamming/interference, such as jamming/interference that may not be removed by receiver RF front end filters for example. The optical ICS may be packaged into a stand-alone ICS box or incorporated into the communications equipment. For example, the optical ICS may be integrated with the jammer and/or the device intended to receive the SOI. If the ICS is integrated with a radio and/or jammer, the ICS may be integrated with the co-located radio and/or jammer without modification to these systems or degradation to their system performance.

Figure 1:
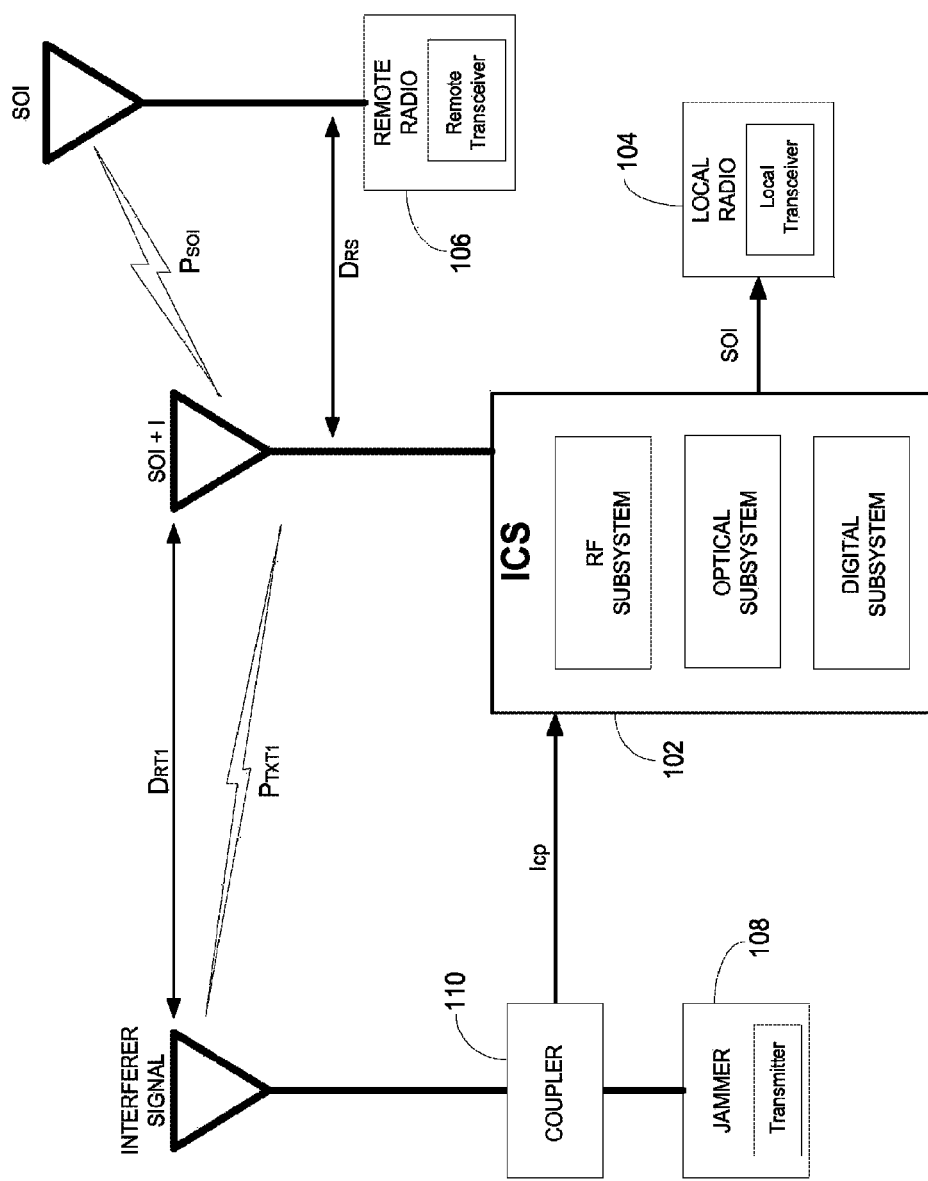
FIG. 1 is a system diagram of an example architecture in which an interference cancellation system (ICS) may be implemented.

FIG. 1 illustrates an example system including an ICS. For example, ICS 102 may be configured to provide interference cancellation in multi-faceted environments, such as environments including one or more remote interferers (e.g., an interferer is not co-located and/or is not coupled to the ICS) and/or one or more unknown jammers/interferers. As illustrated in FIG. 1, Local Radio 104 may be attempting to communicate with Remote Radio 106. Each of the radios may include a transceiver configured to provide operable wireless communications between the radio systems. For example, Local Radio 104 may include a local transceiver that is configured to perform transmit and/or receive processing of radio signals transmitted from and/or received by Local Radio 104. The local transceiver may be coupled to one or more antennas in order to transmit and/or receive radio signals over the air. Similarly, Remote Radio 106 may also include a transceiver (e.g., remote transceiver) that is configured to perform transmit and/or receive processing of radio signals transmitted from and/or received by Remote Radio 106. The remote transceiver may be coupled to one or more antennas in order to transmit and/or receive radio signals over the air.

As an example, Remote Radio 106 may transmit a signal of interest (SOI) to Local Radio 104. For example, Remote Radio 106 may send a communication from an ally that is meant to be received by the user of Local Radio 104. The distance between the location of Remote Radio 106 and Local Radio 104 may be expressed as $D_{RS}$. The received signal power of the SOI may be expressed as $P_{SOI}$.

However, during the period wherein Remote Radio 106 is attempting to communicate with Local Radio 104, one or more interference signals may be emitted by various interference sources. The interference signals may be received at Local Radio 104 in addition to the SOI. For example, Jammer 108 may include a transmitter and one or more antennas that may be configured to transmit an Interferer Signal (I). The Interferer Signal (I) may include transmissions on one or more frequencies that may be the same or close to one or more frequencies that may be used to transmit the SOI, and hence may result in interference between the SOI and the I. The presence of the Interferer Signal may make it difficult for the local transceiver of Local Radio 104 to properly receive and process the SOI. The distance between the location of Jammer 108 and Local Radio 104 may be expressed as $D_{RT1}$. The received signal power of the Interferer Signal at Local Radio 104 may be expressed as $P_{TXT1}$.

In many practical scenarios, the Interferer Signal (I) may be a much higher power signal than the SOI in the vicinity of Local Radio 104. For example, Local Radio 104 may be co-located with Jammer 108 on a military vehicle. Remote Radio 106 may be several miles away from both Local Radio 104 and Jammer 108. Thus, for one or more example it may be assumed that $D_{SOI}$ is much larger (e.g., orders of magnitude larger) than $D_{RT1}$. Additionally, since Jammer 108 typically emits a very high power Interferer Signal that does not travel very far to reach Local Radio 104 (e.g., while Remote Radio 106 may emit a relatively lower power SOI that may travel orders of magnitude farther than the Interferer Signal (I) prior to reaching Local Radio 104), it may also be assumed that $P_{TXT1}$ is much larger (e.g., order of magnitude larger) than $P_{SOI}$. This may be the case when the Jammer is located in or around the vicinity of the ICS, while Remote Radio 2 may be several miles (or more) away from the ICS.

Thus, when both Remote Radio 106 and Jammer 108 are in simultaneous operation, the actual signal received at the one or more antennas associated with Local Radio 104 may be a combined SOI and Interferer Signal (e.g., SOI+I). It may be difficult for Local Radio 104 to determine the SOI from the SOI+I signal using conventional interference mitigation techniques, for example since the I signal may be much higher power than the SOI and may include one or more components in the same frequency range as the SOI.

Therefore, in an example, ICS 102 may be inserted between the one or more antennas associated with Local Radio 104 and the local transceiver of Local Radio 104. ICS 102 may be configured to attempt to cancel the Interferer Signal (I) from the combined SOI+I signal that is received at the one or more antennas associated with Local Radio 104. For example, ICS 102 may obtain a sample of the Interferer Signal (I), for example via Coupler 110 that is operably connected to Jammer 108. For example, in the case where both Hammer 108 and Local Radio 104 are co-located on a military vehicle, Coupler 110 may act to provide ICS 102 with a sample of the Interferer Signal (I) produced by Jammer 108 prior to the Interferer Signal (I) being sent over the air using one or more antennas associated with Jammer 108 (e.g., Coupler 110 may be inserted between the transmitter of Jammer 108 and the one or more antennas associated with Jammer 108). Coupler 110 may be configured to provide a physical cable connection such that ICS 102 may receive a copy of the RF signal being transmitted by Jammer 108. In another example, the Interferer Signal (I) may be communicated to the ICS via a wireless signal. The sample of the Interferer Signal (I) that is provided to the ICS may be expressed as $I_{cp}$.

In order to properly detect the SOI from the SOI+I signal, ICS 102 may be configured to use one or more of RF, optical, and/or digital signal processing (DSP) techniques to cancel the Interferer Signal (I) from the SOI+I signal. For example, the ICS may include an RF Subsystem, an Optical Subsystem, and/or a Digital Subsystem. The RF Subsystem, the Optical Subsystem, and/or the Digital Subsystem may be configured to remove or cancel most or all of the Interferer Signal (I) from the signal received over the one or more antennas associated with Local Radio 104. The techniques utilized by the RF Subsystem, the Optical Subsystem, and/or Digital Subsystem 380 are described in more detail below. Upon successfully cancelling the Interferer Signal (I), ICS 102 may send the SOI to the local transceiver of Radio 104 for further reception processing.

For example, ICS 102 may include one or more of optical components (e.g., an Optical Subsystem), radio frequency components (e.g., an RF Subsystem), and/or digital signal processing components (e.g., a Digital Control Subsystem) to perform interference cancellation. In an example, ICS 102 may convert RF and/or microwave input signals into optical signals. The ICS may use optical components to perform precise attenuation and time delay of the converted signal to achieve optimal cancellation depths across an instantaneous bandwidth of hundreds of MHz. For example, the system may operate to perform interference cancellation from high frequency (HF) bands (e.g., 3-30 MHz) to S bands (e.g., 2 to 4 GHz) and beyond.

The optical components of ICS 102 may be configured to perform precise inversion and recombination of two RF signals, which may be achieved with greater accuracy in the optical domain than in the RF domain. For the undesired interference signal to be perfectly or near-perfectly cancelled, the inversion process may result in an inverted interference signal that is nearly an exact replica of the original signal, except for the relative inversion. In the RF domain, it is difficult to achieve near-perfect replication of a signal over a wide range of frequencies. However, optical components may be configured to achieve near perfect replication and inversion during an inversion and recombination process.

Figure 2:
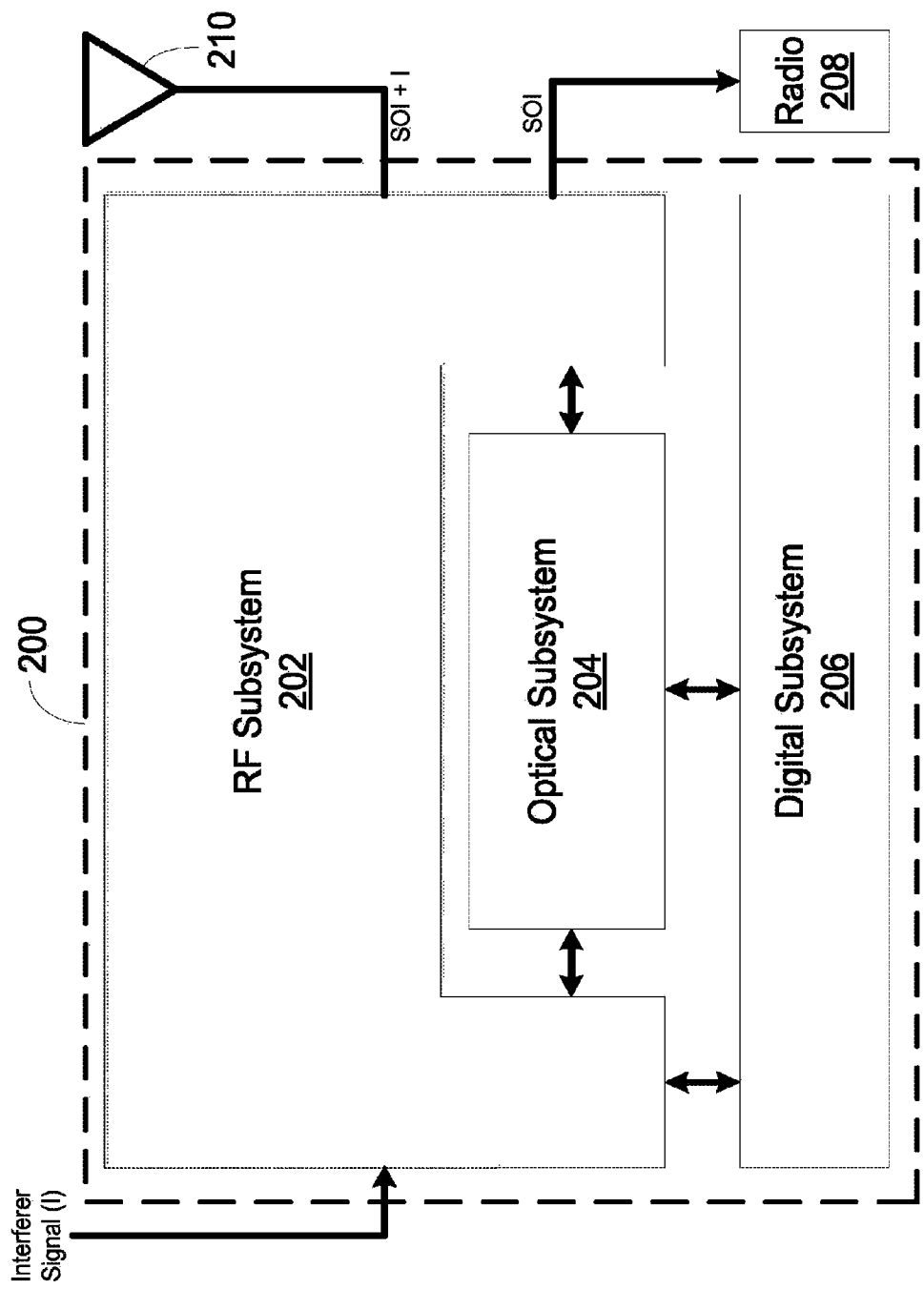
FIG. 2 is a system diagram of an example interference cancellation system.

FIG. 2 illustrates an example ICS 200. For example, ICS 200 may include one or more of RF Subsystem 202, Optical Subsystem 204, and/or Digital Subsystem 206. RF Subsystem 202 may be operably coupled to one or more antennas 210. One or more antennas 210 may be used by Radio 208 for transmitting and/or receiving signals from remote radios. For example, a signal of interest (SOI) plus the Interferer Signal (I) (e.g., SOI+I) may be received via one or more antennas 210 and provided to ICS 200 (e.g., RF Subsystem 202). RF Subsystem 202 may also receive a copy of the Interferer Signal (I) as an input in addition to the combined SOI+I signal received via the one or more antennas 210. For example, ICS 200 may be operably coupled to a jammer that produces the Interferer Signal (I), and the output of the jammer may be provided to ICS 200 via a physical connection (e.g., via a coupler of FIG. 1).

In an example, ICS 200 may receive the Interferer Signal via a second antenna and/or a plurality of second antennas (not shown in FIG. 2). One or more of RF subsystem 202 and/or Digital Subsystem 206 may be configured to determine an estimate of the Interferer Signal (I) based on a signal received via one or more one or more antennas 201 and/or the second antenna and/or the plurality of second antennas.

The estimate off the interferer signal may then be utilized by the ICS. One or more of RF Subsystem 202, Optical Subsystem 204, and/or Digital Subsystem 206 may be configured to utilize knowledge of the Interferer Signal (I) to cancel Interferer Signal from the combined SOI+I signal received via the one or more antennas 210. The result of the cancellation may be the SOI. RF Subsystem 202 may send the SOI to Radio 208 that is operably coupled to the RF subsystem for further reception processing (e.g., demodulation, decoding, etc.).

As an example, many common types of jammers are configured to saturate receivers operating at or near 300 MHz. For example, such jammers may be designed to prevent communications that utilize frequencies in or around 300 MHz (e.g., garage door openers). Typical broadband, noise-like jammers in this range may output signals with power levels of approximately 100 W (50 dBm) over a 300 MHz to 400 MHz bandwidth. However, such a jammer may prevent communication over a large portion of the 225 MHz to 512 MHz UHF communications band as well as a major portion of the 292 MHz to 318 MHz UHF Satellite Communication (SATCOM) band, in addition to the desired 300 MHz cancellation. The +50 dBm 100 MHz broadband noise may be equivalent to a 15 dBm noise signal over a plurality of 25 kHz communications channels. Assuming 20 dB of antenna coupling loss between a jammer and ICS 200, the jamming signal (e.g., Interferer Signal (I)) reaching the radio transceiver antenna may be expected to be around −5 dBm over the 25 kHz channel. For example, 20 dB antenna coupling estimate for 300 MHz operation may be estimated using two quarter wave monopoles separated by three wavelengths over a perfect ground plane. This level of interference may be more than sufficient to jam communications in this band, assuming transceiver sensitivity between −110 dBm and −120 dBm for 10 dB signal-to-noise and distortion ratio (SINAD), depending on the operating mode and application.

Optical cancellation techniques may offer broadband interference cancellation with a significantly greater depth than conventional RF cancellation. Optical Subsystem 204 may be configured to perform interference cancellation using optical interference cancellation techniques. For example, for a 100 MHz broadband jamming signal, over 30 dB of interference cancellation may be obtained using optical techniques. Optical cancellation is typically more effective than RF cancellation alone, for example due to the higher bandwidth of operation and much lower amplitude and/or frequency dispersion in optical components as compared to RF components. An optical link between a received and sampled jammer output (e.g., the sampled jammer signal) and ICS 200 may reduce directly coupled jammer power, preventing the jammer signal from reaching the transceiver antenna input. Optical cancellation does not suffer from RF leakage into an RF interference cancellation system, which may create offsets that reduce effective jammer cancellation in the ICS.

By cancelling the majority of the interferer signal in the optical domain, ICS 200 may allow communication systems to perform simultaneous jamming and operative communication in the jammed frequency range. This optical cancellation technique may utilize active cancellation between jammers (e.g., counter-IED jammers) and radio systems to prevent self-interference. The ICS may also be applied to commercial systems suffering from saturated receivers. Optical interference cancellation may allow for processing an extremely wide range of frequencies with minimum distortion. The optical components may allow for multiple orders of magnitude in bandwidth, as well as lower amplitude and phase fluctuation.

For an active interference implementation, the interfering signal may be accurately estimated or sampled in real time. A copy of the clean transmit signal from any jammer or interferer may be obtained using direct coupling or magnetic coupling with an electromagnetic interference (EMI) probe and/or current probe. In the case of a remote jammer (e.g., the jammer is not directly or physically connected to the ICS), a copy of the jamming signal may be obtained by accurately estimating the jammer signal using a signal received via an antenna.

Figure 3A:
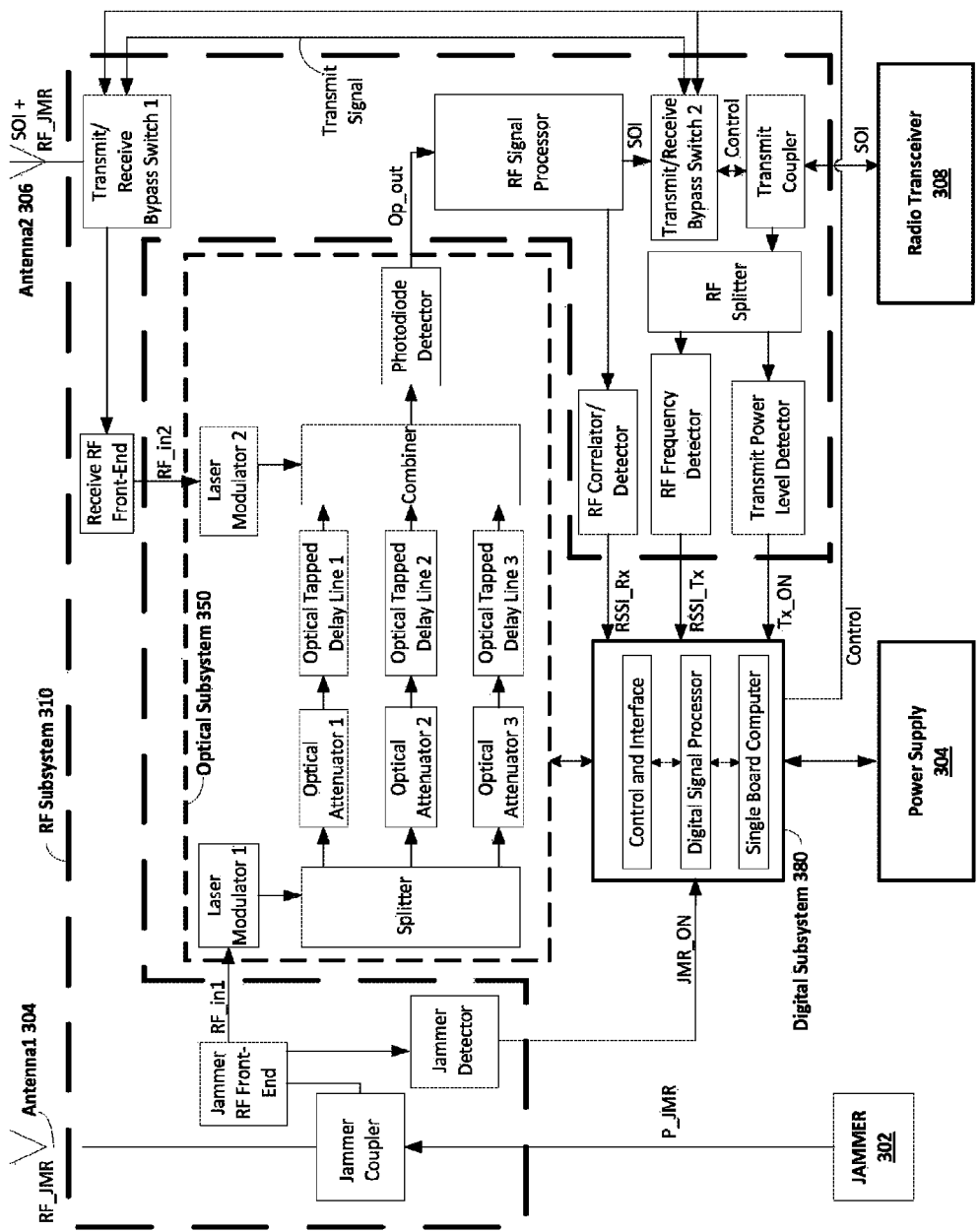
FIG. 3A illustrates an example system architecture for an ICS.

FIG. 3A illustrates an example system architecture for an ICS. For example, an ICS may include one or more of RF Subsystem 310, Optical Subsystem 350, and/or Digital Subsystem 380. Power Supply 304 may provide power to one or more of RF Subsystem 310, Optical Subsystem 350, and/or Digital Subsystem 380. As shown in FIG. 3A, Jammer 302 may be operably coupled to RF Subsystem 310. RF Subsystem 310 may include one or more RF processing components, and the components and functionality of RF Subsystem 310 are described in more detail with respect to FIG. 3C. Additionally, Jammer 302 may be operably coupled to one or more antennas (e.g., Antenna1 304). Jammer 302 may be coupled to the one or more antennas (e.g., Antenna1 304) via RF Subsystem 310. For example, a jammer coupler with RF Subsystem 310 may be used so that the ICS may be quickly inserted between an operational jammer and an antenna used to transmit the jammer signal. P_JMR may represent the jammer signal prior to being transmitted by the one or more antennas (e.g., Antenna1 304). RF_JMR may represent the RF jammer signal transmitted via the one or more antennas (e.g., Antenna1 304).

In the example shown in FIG. 3A, Jammer 302 may be physically connected to RF Subsystem 310 in order for RF Subsystem 310 to obtain a sample or copy of the jammer signal. A copy of the transmitted jammer signal (e.g., RF_JMR) may be used as an input to the interference cancellation system. For example, one or more components of RF Subsystem 310 (e.g., Jammer RF Front-End processing component(s), Jammer Detector components, etc.) may perform RF processing on the sample/copy of the jammer signal (e.g., RF_JMR) in order to filter the jammer signal and/or detect jammer operation prior to processing by Optical Subsystem 350. Such Jammer signal pre-processing will be described in more detail with respect to FIG. 3C.

When Jammer 302 is in use, jammer detection component(s) of RF Subsystem 310 may send an indication that Jammer 302 is in operation to Digital Subsystem 380 via the JMR_ON signal. The ICS may be configured to determine to begin interference cancellation based on the concurrent detection of Jammer 302 transmission and lack of transmission by Radio Transceiver 308. For example, Radio Transceiver 308 may be any radio system that may experience interference due to transmissions from Jammer 302. Radio Transceiver 308 may be configured to perform receive and/or transmit processing of RF signals transmitted via one or more antennas (e.g., Antenna2 306). To prevent interference from Jammer 302 from saturating Radio Transceiver 308 during periods where it is attempting to receive an SOI via Antenna2 306, an ICS may be inserted between Radio Transceiver 308 and Antenna2 306. The ICS may receive a signal comprised of the combination of the SOI and the Interferer Signal (I) (e.g., SOI+RF_JMR) via Anetnna2 306 and may remove a large majority of the Interferer Signal (I) (e.g., RF_JMR) such that the SOI may be passed to Radio Transceiver 308 for further processing.

After performing RF preprocessing on the sampled jammer signal (e.g., RF_JMR), RF Subsystem 310 may send a copy of the Jammer signal to Optical Subsystem 350 in order for Optical Subsystem 350 to perform cancellation of the jammer signal from the signal that is received via Antenna2 306. For example, RF_in1 may represent the copy of the jammer signal (e.g., RF_JMR) provided to Optical Subsystem 350. Operation of Optical Subsystem 350 will be described in more detail with respect to FIG. 3B.

In an example, Antenna2 306 may be configured to receive a signal of interest from a remote radio (e.g., SOI). While Jammer 302 is in operation, the jammer signal (e.g., RF_JMR) may interfere with SOI such that Antenna2 306 receives the signal SOI+RF_JMR RF Subsystem 310 may perform RF preprocessing on the signal received via Antenna2 306 (e.g., SOI+RF_JMR) prior to sending the combined jammer and SOI signal to Optical System 350 for interference cancellation. For example, RF Subsystem 310 may be configured to perform some initial cancellation of the jammer signal (e.g., RF_JMR) from the combined jammer and SOI signal (e.g., SOI+RF_JMR) prior to sending the signal to Optical Subsystem 350. RF Subsystem 310 may also perform other signal processing and filtering on the combined jammer and SOI signal (e.g., SOI+RF_JMR) as is described with respect to FIG. 3C prior to sending the combined jammer and SOI signal (e.g., SOI+RF_JMR) to Optical Subsystem 350. The signal representing the combined jammer and SOI signal (e.g., SOI+RF_JMR) sent from RF Subsystem 310 to Optical Subsystem 350 may be represented as RF_in2.

Optical Subsystem 350 may receive a copy of the (e.g., pre-processed) jammer signal (e.g., RF_in1) and a copy of the (e.g., pre-processed) combined jammer and SOI signal (e.g., RF_in which may correspond to the combined jammer plus SOI signal −SOI+RF_JMR) from RF Subsystem 310. Optical Subsystem 350 may be configured to cancel most or all of the interferer signal (e.g., RF_in1) from the combined jammer and SOI signal (e.g., RF_in2). The optical interference cancellation process may be described in more detail with respect to FIG. 3B. Generally, each of the interferer signal (e.g., RF_in1) and the combined jammer and SOI signal (e.g., RF_in2) may be converted from the RF domain to the optical domain. One of the two signals (e.g., RF_in1 or RF_in2) may be inverted during the optical conversion process. One or more optical paths (e.g., an optical path may include one or more optical attenuators and one or more optical delay lines) may be used to attenuate and/or delay the optically converted jammer signal. Optical Subsystem 350 may be controlled by Digital Subsystem 380 to variably attenuate and/or delay the optical version of the jammer signal to achieve maximum cancellation. Digital Subsystem 380 may control the variable attenuation and or variable delays applied by Optical Subsystem 350 based on the output of Optical Subsystem 350 and processing performed by RF Subsystem 310.

The variably attenuated and variably delayed optical version of the jammer signal may then be combined with the optically converted combined jammer and SOI signal. One of the variably attenuated and variably delayed optical version of the jammer signal and the optically converted combined jammer and SOI signal may be inverted prior to being combined by Optical Subsystem 350. The resultant signal may be an optical version of the SOI (or nearly so), provided that correct attenuation and/or delays were applied to the optical jammer system. The optical version of the SOI may then be converted back to the RF domain and output by Optical Subsystem 350 for further processing by RF Subsystem 310. RF Subsystem 310 may perform further processing on the output of Optical Subsystem 350 in order to provide additional information that may be used by Digital Subsystem 380 for controlling Optical Subsystem 350. The RF version of the SOI signal may then be sent from RF Subsystem 310 to Radio Transceiver 308.

Figure 3B:
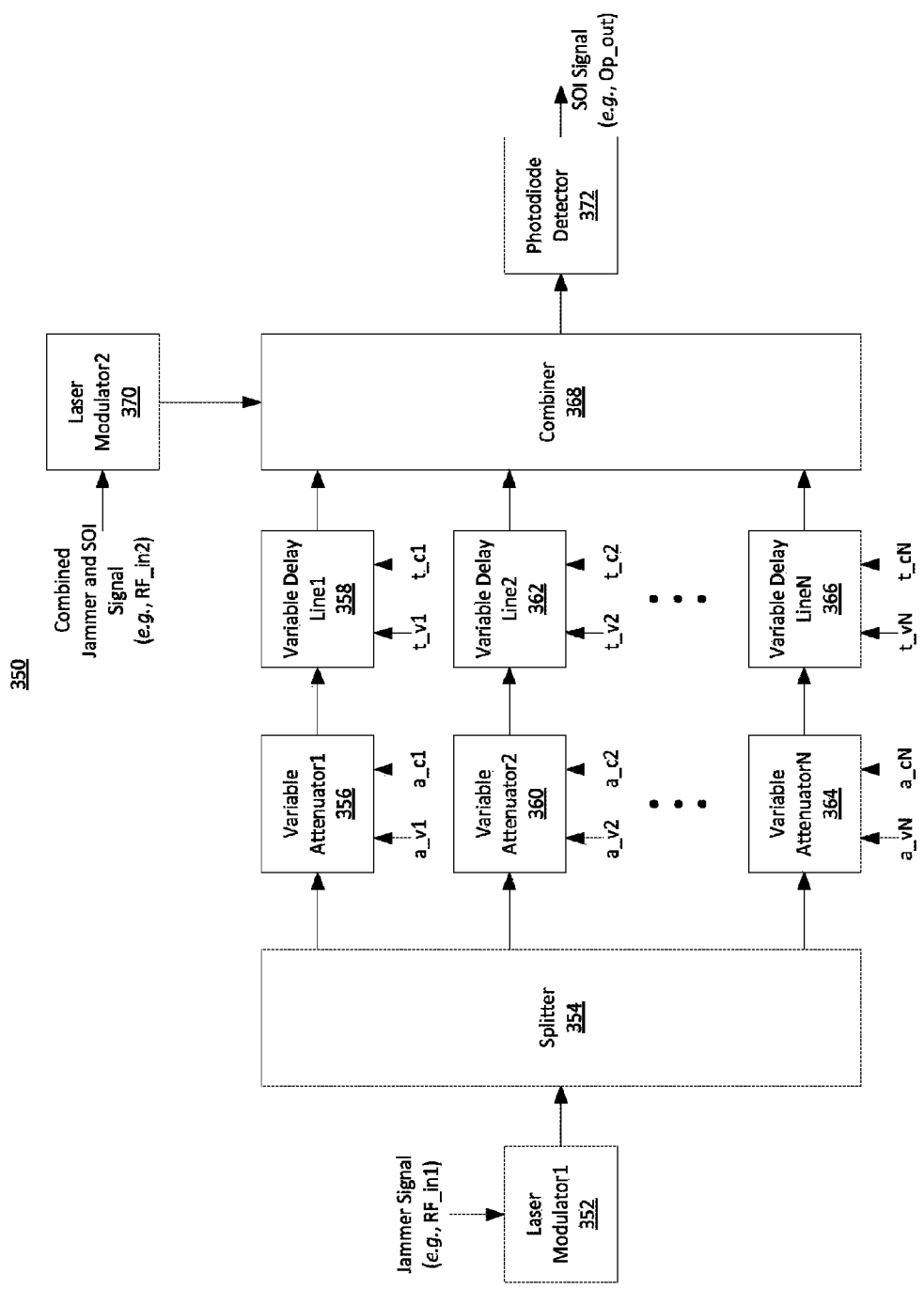
FIG. 3B illustrates an example architecture of an Optical Subsystem of an ICS.

FIG. 3B illustrates an example architecture of Optical Subsystem 350. The RF jammer signal (e.g., RF_in1) may be received from RF Subsystem 310 via Laser Modulator1 352. The terms laser modulator, optical modulator, and/or optical transmitter module may be used interchangeably herein. For example, Laser Modulator1 352 may be a laser modulator that performs a −180 degree optical phase shift on the jammer signal (e.g., RF_in1) during the RF-to-optical conversion process. The result of the −180 phase shift to the jammer signal during RF-to-optical conversion may be referred to herein as the optically inverted jammer signal. The RF-to-optical conversion may be realized using one or more laser modulators. In an example, the optical transmitters/laser modulators may utilize a counter phase Mach-Zehnder modulator (MZM) in order to convert the RF signal to optical signals. In another example, the optical transmitters/laser modulators may utilize direct modulation from RF to optical as described herein. Laser Modulator1 352 may provide RF amplitude and phase tracking, minimal DC offset, and/or reduced distortion at the Photodiode Detector output (e.g., output of Photodiode Detector 372). The phase shifter (e.g., −180 phase shift) may be implemented as part of Laser Modulator1 352 and/or may be a separate component.

The optically inverted jammer signal output from Laser Modulator1 352 may be sent to Splitter 354. For example, the optically inverted jammer signal may be split into a plurality of separate optical processing paths for further processing. Each optical processing path may be individually attenuated and/or individually delayed. For example, a first optical processing path from Splitter 354 may include Variable Attenuator1 356 and/or Variable Delay Line1 358. The variable attenuation and variable delay utilized by the optical processing paths of Optical Subsystem 350 are described in more detail below. Control signals that control the operation of the components of the first optical processing path (e.g., Variable Attenuator1 356 and/or Variable Delay Line1 358) may be provided by Digital Subsystem 380. For example, a_c1 may be a control signal from Digital Subsystem 380 that controls the amount by which Variable Attenuator1 356 attenuates the optically inverted jammer signal sent from Splitter 354 over the first optical processing path. Similarly, t_c1 may be a control signal from Digital Subsystem 380 that controls the amount by which Variable Delay Line1 358 delays the optically inverted jammer signal sent from Splitter 354 over the first optical processing path. The amount of attenuation and/or the amount of time delay may be controlled in order to achieve a desired or maximum amount of interference cancellation.

As may be appreciated, embodiments contemplate that the optically inverted jammer signal may be split by Splitter 354 into any number of separate optical processing paths for attenuation and delay based on the desired level of cancellation and operating environment. For example, each optical processing path (e.g., an optical attenuator and/or an associated optical delay line) may be used to cancel a different interference signal(s) and/or different components of an interfering signal. For example, a first optical processing path may be configured to cancel the direct line interferer signal. A second optical processing path may be configured to cancel a first multipath propagation of the interferer signal. An Nth (e.g., where N may be an integer) optical processing path may be configured to cancel an Nth multipath propagation of the interferer signal, etc. In an example, each optical processing path may be configured to cancel a different interferer. The optical attenuation weight and/or the optical delay line weight of each of the optical processing paths may be different depending on the type of cancellation desired.

Each optical processing path may be associated with different control signals from Digital Subsystem 380. For example, a second optical processing path may include Variable Attenuator2 360 and/or Variable Delay Line2 362. An Nth optical processing path may include Variable AttenuatorN 364 and/or Variable Delay LineN 366. Digital Subsystem 380 may control the operation of the components of each of the optical processing paths to achieve a desired level of interference cancellation. For example, Variable Attenuator1 356 may be controlled with signal a_c1, Variable Attenuator2 360 may be controlled with signal a_c2, and/or Variable AttenuatorN 364 may be controlled with signal a_cN. Similarly, Variable Delay Line1 358 may be controlled with signal t_c1, Variable Delay Line2 362 may be controlled with signal t_c2, and/or Variable Delay LineN 366 may be controlled with signal t_cN.

Power may be provided to the components of Optical Subsystem 350 by Power Supply 304. In an example, the power may be routed to the components of Optical Subsystem 350 from RF Subsystem 310 and/or from Digital Subsystem 380. In an example, there may be a direct connection from Power Supply 304 to Optical Subsystem 350. The power signal for Variable Attenuator1 356 may be signal a_v1, the power signal for Variable Attenuator2 360 may be signal a_v2, and the power signal for Variable AttenuatorN 364 may be signal a_vN. The power signal for Variable Delay Line1 358 may be signal t_v1, the power signal for Variable Delay Line2 362 may be signal t_v2, and the power signal for Variable Delay LineN 366 may be signal t_vN. Power Supply 304 may also supply power to one or more other components of Optical Subsystem 350, for example one or more of Laser Modulator1 352, Splitter 354, Combiner 368, Laser Modulator2 370, Photodiode Detector 372, and/or the like.

In an example, the optically inverted jammer signal may be processed by one or more optical processing paths prior to being combined with an optically converted version of the combined jammer and SOI signal. For example, the combined jammer+SOI signal (e.g., RF_in2) may be converted from RF to the optical domain by Laser Modulator2 370. Laser Modulator1 352 and Laser Modulator2 370 may be two matched laser modulators such that coherent optical cancellation may be performed. For example, Laser Modulator1 352 may be configured to invert the jammer signal during the RF-to-optical conversion process such that the optically inverted jammer signal may be combined optically with the optically converted combined jammer and SOI signal to result in cancellation of the RF_JMR signal such that the SOI signal can be isolated. An optical signal that is optically phase shifted by −180 degrees that is combined with an unshifted version of the same optical signal may result in complete destructive interference/complete cancellation if the phase shift is ideal. Phase shifting in the optical domain may achieve near ideal results across a wide frequency range.

Thus, after the optically inverted jammer signal is processed by the variable attenuator(s) and/or variable delay line(s), for example to properly scale and time-align the optically inverted jammer signal with the optically converted combined jammer and SOI signal, the output of the optical processing lines may be combined with the optically converted combined jammer and SOI signal at Combiner 368. If values for variable attenuation and/or variable delays were properly selected, the combining of the optical signals should result in the cancellation of the jammer signal from the combined jammer and SOI signal. This optical version of the SOI signal may be sent to Photodiode Detector 372 for further processing and conversion back to the RF domain. The SOI signal (e.g., Op_out) may then be sent back to RF Subsystem 310 for further processing. For example, signal Op_out may be tested to determine whether a desired level of interference cancellation has been achieved. An RF Correlator/Detector 338 (e.g., FIG. 3C) may be used to determine the level of interference cancellation, for example by associating the relative power level of the Op_out signal with the level of interference cancellation. Digital Subsystem 380 may determine whether the signal output from the optical subsystem representing the SOI signal (e.g., Op_out) meets a threshold signal-to-noise (SNR) level. For example, if the Digital Subsystem determines that the SNR of the Op_out signal is 10 dB or greater, then it may be determined that the interference from the jammer has been sufficiently cancelled and the resultant SOI signal (e.g., Op_out) may be sent to the radio Transceiver 308 (e.g., FIG. 3A).

Figure 3C:
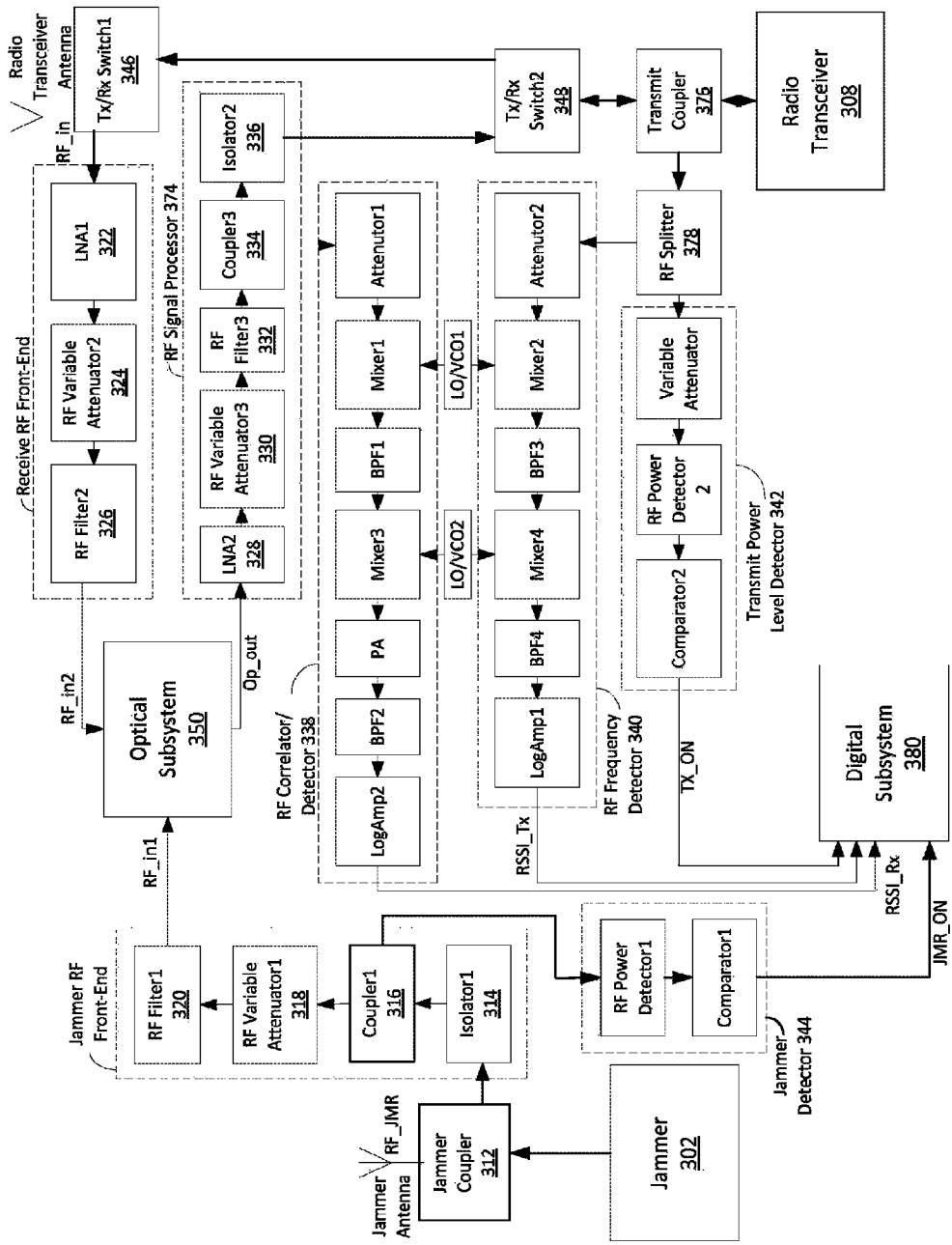
FIG. 3C illustrates an example architecture of an RF Subsystem of an ICS.

FIG. 3C is an example system diagram of RF processing components that may be included in RF Subsystem 310. For example, an interferer signal may be sent from Jammer 302 to Jammer Coupler 312. Jammer Coupler 312 may split the interferer signal from Jammer Coupler 312 such that the signal may be transmitted via the jammer antenna and a sample or copy of the signal may be used for interference cancellation by the ICS. Jammer Coupler 312 may provide an accurate sample of the jammer signal to the Jammer RF Front-End Processing components. Jammer Coupler 312 may be an RF coupler, for example with a coupling factor in the range of 20 to 50 dB depending on the jammer output power. In an example, a sample of the jammer signal may be obtained using a current probe that is operably coupled to the jammer antenna.

Jammer Coupler 312 may send a sample of the jammer signal to be transmitted over the jammer antennas to one or more jammer RF front-end processing components. Example RF front-end processing components may include one or more of variable attenuator(s), a low noise amplifier(s), RF bandpass filter(s), coupler(s), isolator(s) and/or tunable RF filter(s). The jammer RF front-end components may be configured to filter the jammer signal prior to processing by the Optical Subsystem. For example, Jammer RF Front End may be configured to prevent the generation of additional harmonics and/or intermods of the jammer signal within the ICS.

For example, as illustrated in FIG. 3C, a copy of the jammer signal may be received at Isolator1 314 of the jammer RF front-end. Isolator1 314 may be a passive device that may be used to prevent jammer and/or other RF signals from being affected by excessive signal reflection from the RF processing components and/or to control the direction of signal flow in the RF subsystem. Isolator1 314 may pass a copy of the jammer signal to Coupler1 316. Coupler1 316 may be configured to send a copy of the jammer signal to Jammer Detector 344. Jammer Detector 344 may be configured to detect when the jammer is in operation. For example, when the jammer is in use, Jammer Detector 344 may indicate to Digital Subsystem 380 that the jammer is on using signal JMR_ON. The ICS (e.g., Digital Subsystem 380) may be configured to determine to begin interference cancellation based on the concurrent detection of Jammer transmission (e.g., based on JMR_ON) and lack of transmission by Radio Transceiver 308.

Jammer Detector 344 may be configured to automatically detect when the Jammer begins transmission. For example, Jammer Detector 344 may include an RF Power Detector (e.g., RF Power Detector1) and/or a comparator (e.g., Comparator1). The comparator may be used to set the threshold power level used to determine whether Jammer 302 is currently transmitting/operating. The comparator may be an RF component that compares two voltages and/or two currents and outputs an indication of which of the two inputs are larger. For example, the comparator may set a power level threshold, above which it is assumed Jammer 302 is in operation, below which it is assumed that Jammer 302 is not in operation. RF Power Detector1 of Jammer Detector 344 may be configured to detect the jammer signal and/or the power level of the jammer signal and send an indication of the power level to comparator1 of Jammer Detector 344. The comparator1 may be configured to compare the received power level to a power level threshold. For example, the power level threshold may be +24 dBm, although the power level may vary depending on the configuration and properties of Jammer 302. If the received power level exceeds the power level threshold, then Comparator1 of Jammer Detector 344 may send an indication that Jammer 302 is currently transmitting to Digital Subsystem 380, for example via the JMR_ON signal. If the received power level does not exceed the power level threshold, then Comparator1 of Jammer Detector 344 may send an indication that Jammer 302 is not currently transmitting (e.g., is turned off) to Digital Subsystem 380, for example via the JMR_ON signal.

One or more jammer RF front-end components may be configured to perform initial interference cancellation processing on the jammer signal prior to further interference cancellation processing in Optical Subsystem 350. For example, RF Variable Attenuator1 318 may be a variable RF attenuator that is controlled by Digital Subsystem 380. For example, control signal CTRL_AT1 may be used by Digital Subsystem 380 to control RF Variable Attenuator 318 (e.g., not shown in FIG. 3C). By varying the attenuation level of RF Variable Attenuator1 318 prior to sending the jammer signal to Optical Subsystem 350, Digital Subsystem 380 may selectively perform initial interference cancellation processing in the RF domain prior to further processing in the optical domain. Control of RF Variable Attenuator 318 by Digital Subsystem 380 (e.g., using CTRL_AT1) may be based on feedback received by Digital Subsystem 380 from one or more of RF Correlator/Detector 338, RF Frequency DetectorRSSI 340, and/or Transmit Power Level Detector 342. The variably attenuated RF jammer signal may then be sent to RF Filter1 320. RF Filter1 320 may include one or more of a fixed RF filter and/or a variable RF filter for processing the jammer signal. RF Filter1 320 may send the preprocessed jammer signal (e.g., RF_in1) to optical subsystem 350 for further interference cancellation processing.

Transmit/Receive Switch1 346 may be operably coupled to Antenna2 306 and may send SOI+RF_JMR to the Receive RF Front-End component of the RF Subsystem. The Receive RF Front-End components may include one or more variable/tunable attenuator(s), low noise amplifier(s) (LNAs), fixed RF filer(s), and/or variable RF filter(s). For example, LNA1 322 may amplify the signal received via Antenna2 306 and send the amplified signal to RF Variable Attenuator2 342. RF Variable Attenuator2 342 may be a controllable/ tunable attenuator that is controlled by Digital Subsystem 380, for example using control signal CTRL_AT2. Digital Subsystem 380 may be configured to vary the attenuation level of RF Variable Attenuator2 342 in order perform initial interference cancellation processing of the combined jammer and SOI signal. The variably attenuated jammer and SOI signal may then be send to RF Filter2 326. RF Filter2 326 may include a fixed RF bandpass filter and/or tunable RF filter to process and filter the combined jammer and SOI signal prior to processing in Optical Subsystem 350. The RF pre-processed combined jammer and SOI signal (e.g., RF_in2) may then be sent to Optical Subsystem 350 for further interference cancellation processing.

Optical Subsystem 350 may receive the RF pre-processed jammer signal (e.g., RF_in1) and the RF pre-processed combined jammer and SOI signal (e.g., RF_in2), may convert the signals from the RF domain to the optical domain, and may perform further interference processing (e.g., variable attenuation and/or inserting variable time delays) prior to combining the optically converted signals to achieve interference cancellation (See e.g., FIG. 3B). The resultant signal representing the SOI may be converted back to the RF domain and sent to RF Signal Processor 374 (e.g., signal Op_out). Op_out may represent any residual interference signal(s) present at the photodiode detector output (e.g., if the interferer signal was not completely cancelled) and the SOI, and Op_out may be sent to RF Signal Processor 374. The SOI and the residual jammer signal at the output of Optical Subsystem 350 (e.g., Op_out) may be processed and filtered by RF Signal Processor 374 prior to being sent to one or more of RF Correlator/Detector 338 (e.g., an RF Power Meter) and/or Transmit/Receive Switch2 348.

RF Signal Processor 374 may include one or more of fixed RF filter(s), low noise amplifier(s) (LNA(s)), fixed attenuator(s), variable attenuator(s), coupler(s), isolator(s), and/or other RF processing components, for example depending on the application of the ICS. RF Signal Processor 374 may be configured to process the output of Optical Subsystem 350 with minimal effect on the SOI. For example, when Optical Subsystem 350 acts to cancel the interferer signal to obtain a clean version of the SOI, Optical Subsystem may introduce noise and/or attenuate the signal of interest during the interference cancellation process. In order to provide additional gain to the SOI after cancellation, RF Signal Processor 374 may be applied to the output of Optical Subsystem 350. For example, RF Signal Processor 374 may utilize LNA2 328 to increase the power level of the SOI without further accentuating the noise that may have been introduced to the signal. In an example, RF Signal Processor 374 (e.g., and/or one or more of the receive RF front-end components or the jammer RF front-end components) may be configured to be linear devices in order to avoid introducing distortion to the signal of interest.

After processing by LNA2 328, the signal representing the SOI plus any residual interference may be sent to RF Variable Attenuator3 330. RF Variable Attenuator3 330 may be a variable attenuator controlled by Digital Subsystem 380, for example using control signal CTRL_AT3. Digital Subsystem 380 may variably attenuate the signal representing the SOI plus any residual interference using RF Variable Attenuator3 330, for example to determine when Radio Transceiver 308 is operating in transmit mode. The variably attenuated signal representing the SOI plus any residual interference may then be filtered by RF Filter3 334 to further remove one or more noise components that may have been introduce by optical Subsystem 350. The signal representing the SOI plus any residual interference may then be sent to Coupler3 334, which may send a copy of the signal to each of RF Correlator/Detector 338 and/or Isolator2 336. Isolator2 336 may isolate the RF signal (e.g., prevent reflection, etc.), and may send a copy of the signal to Transmit/Receive Switch 348. Depending on the configuration and/or current mode of operation of the ICS, the signal (which may represent the SOI if most or all of the interferer signal was successfully cancelled) may be passed to Radio Transceiver 308 for further processing.

RF Signal Processor 374 may send the filtered SOI and residual interference signal to RF Correlator/Detector 338. RF Correlator/Detector 338 may send an RF correlator output signal (e.g., RSSI_Rx) to Digital Subsystem 380. The RF correlator output signal may be used by Digital Subsystem 380 to control the amplitude of one or more variable attenuators (e.g., RF variable attenuators and/or optical variable attenuators of Optical Subsystem 350) and/or time delay and/or phase of variable time delay units. The signal RSSI_Rx may be a received signal strength indication (RSSI) of any resultant interference signal as detected by the RF Correlator/Detector (e.g., plus the SOI). For example, the signal RSSI_Rx may be considered a measure of the cancellation depth of the ICS. For example, when RSSI_Rx is minimized, the cancellation depth of the ICS may be considered to be maximized (e.g., the cancellation of the jammer signal may be maximized). When RSSI_Rx is high or maximized, the cancellation depth of the ICS may be considered to be minimal (e.g., the jammer signal may be essentially uncancelled). Thus, the signal RSSI_Rx may be considered a measure of the dynamic range of the ICS.

In an example, RF Correlator/Detector 338 may include one or more mixers with integrated synthesizers, fixed RF attenuators, bandpass filters, and/or Log Amps. The output signal RSSI_Rx may be measured continually during cancellation to determine the residual content of the cancelled jammer signal. If the signal RSSI_Rx is minimized, Digital Subsystem 380 may determine that the cancellation of the jammer has been maximized. When a cancellation threshold for RSSI_Rx is detected by Digital Subsystem 380 (e.g., the power level of RSSI_Rx falls below a threshold), Digital Subsystem 380 may control Transmit/Receive Switch 2 to send the clean SOI signal to Radio Transceiver 308 for signal processing and reception.

Digital Subsystem 380 may be configured to implement a control loop that utilizes the output of RF Correlator/Detector 338 as feedback for determining appropriate value for the attenuator gains and/or time delays of Optical Subsystem 350 and/or for the attenuation gains of one of more RF variable attenuators. These parameters may be stepped and/or varied in order to minimize RF Correlator/Detector 338 output. Additionally, changes in RF Correlator/Detector 338 RSSI output levels detected in response to changes in attenuation and/or time delay may be used as feedback rather than or in addition to the overall magnitude of the RF Correlator/Detector 338 RSSI output. Since the SOI may be associated with power levels that are orders of magnitude smaller than that of the jammer signal (e.g., Jammer 302 may operate on the order of +50 dBm (e.g., −5 dBm per 25 kHz channel) while the SOI may be on the order of −60 dBm or lower. Since RF Correlator/Detector 338 output may be considered a measure of RF power at the frequency of the SOI, reductions in the power level of RF Correlator/Detector 338 output may be mainly due to the cancellation of the jammer signal from the combined jammer plus SOI signal. DC offsets, if present in the control loop, may have little to no effect on the cancellation efficiency (e.g., do not reduce the cancellation efficiency) because, the DC offset may be constantly added to RF Correlator/Detector 338 output value and hence may not affect the difference in power levels utilized by the control loop during ICS operation. These DC offsets may be due to electronic component DC offsets as well as background noise presence in the RF signal at the input of the power meter. The interference cancellation attenuation may be a function of the power meter dynamic range and/or SOI bandwidth.

Although the ICS interfaces with Radio Transceiver 308 that is used to transmit and/or receive SOIs, the transmit output power and transmit frequency of Radio Transceiver 308 may be unknown to the ICS. For example, the ICS may be configured to be attached to wide range of radio types (e.g., utilizing different frequencies and/or bandwidths), and thus the ICS may be configured to determine the frequency of operation for a given Radio Transceiver 308 and/or to determine when Radio Transceiver 308 is in transmitting mode. In an example, the components of RF Subsystem 310 may be configured to automatically detect the transmit output power and frequency of Radio Transceiver 308. For example, Transmit Power Level Detector 342 may be configured to measure the transmit power of Radio Transceiver 308.

One or more of Transmit/Receive Switch 1 346 and/or Transmit/Receive Switch2 348 may be controlled by Digital Subsystem 380 based on whether Radio Transceiver 308 is in transmit mode or receive mode. For example, when Radio Transceiver 308 begins to transmit (e.g., as detected by Transmit Power Level Detector 342), the signal to be transmitted may be sent from Radio Transceiver 308 to Transmit Coupler 376. Transmit Coupler 376 may send the signal to be transmitted to Transmit/Receive Switch2 348. Since Radio Transceiver 308 is in transmit mode, Digital Subsystem 380 may control Transmit/Receive Switch2 348 to send the transmit signal to Transmit/Receive Switch1 346. Since Radio Transceiver 308 is in transmit mode, Digital Subsystem 380 may control Transmit/Receive Switch 1 346 to send the transmit signal to Antenna2 306 for transmission.

When Digital Subsystem 380 determines Radio Transceiver 308 is in receive mode (e.g., based on signals received from Transmit Power Level Detector 342), Digital Subsystem 380 may control the transmit/receive switches (e.g., Transmit/Receive Switch1 346 and/or Transmit/Receive Switch2 348) based on whether Jammer 302 is currently in operation. For example, if Radio Transceiver 308 is in receive mode (e.g., determined based on Transmit Power Level Detector 342 output) and Jammer 302 is on (e.g., determined based on Jammer Detector 344 output), Digital Subsystem 380 may control Transmit/Receive Switch1 346 to send the signal received via Antenna2 306 to receive RF front-end components for interference cancellation processing and may control Transmit/Receive Switch2 348 to send the output of RF signal Processor 374 to Transmit Coupler 376 for processing by Radio Transceiver 308. If Radio Transceiver 308 is in receive mode (e.g., determined based on Transmit Power Level Detector 342 output) and Jammer 302 is off (e.g., determined based on Jammer Detector 344 output), Digital Subsystem 380 may control Transmit/Receive Switch 1 346 to send the signal received via Antenna2 306 directly to Transmit/Receive Switch2 348. Digital Subsystem 348 may then control Transmit/Receive Switch2 348 to send the output of RF signal Processor 374 to Transmit Coupler 376 for processing by Radio Transceiver 308.

In order to determine whether Radio Transceiver is transmitting and/or the frequency of operation of Radio Transceiver 308, Transmit Coupler 376 may send a copy of the signals to be transmitted to RF Splitter 378. RF Splitter 378 may split the transmission signal and forward the signal to RF Frequency Detector 340 and Transmit Power Detector 342.

RF Frequency Detector 340 may be configured to measure the received RF signal and/or a RF signal to be transmitted in order to determine the frequency of the signal. RF Frequency Detector 340 may include one or more mixer(s) with integrated synthesizer(s), fixed RF attenuator(s), bandpass filter(s), and/or Log Amp(s). RF Frequency Detector 340 may be configured to automatically detect the frequency by fast tuning of the synthesizers for a known, fixed frequency, which may be referred to as an IF frequency (e.g., an example IF fixed frequency may be 70 MHz). When a maximum output power is measured at the output of the Log Amp by Digital Subsystem 380, input frequency to RF Frequency Detector 340 may be determined by Digital Subsystem 380 based on knowledge of the known, fixed IF frequency and the current tuning levels of the local oscillators (e.g., components of the synthesizers).

The RSSI_TX signal may be received by Digital Subsystem 380 from RF Frequency Detector 340, and Digital Subsystem 380 may determine the frequency of the input of RF Frequency Detector 340 based on RSSI_TX and the tuning levels of the synthesizers. Transmit Power Level Detector 342 may be configured to automatically determine the transmission power of a signal being transmitted via Antenna 2 306. Transmit Power Level Detector 342 may include one or more variable attenuator(s), an RF power detector(s), and/or comparator(s). The signals TX_ON and RSSI_TX may be utilized by Digital Subsystem 380 to determine parameters associated with Radio Transceiver 308 (e.g., power level and/or frequency) used for transmitting via Antenna2 306. If the transmit and receive frequencies are the same for Radio Transceiver 308, the knowledge of the transmit frequency may be used to effectively cancel the jammer at that frequency.

Figure 3D:
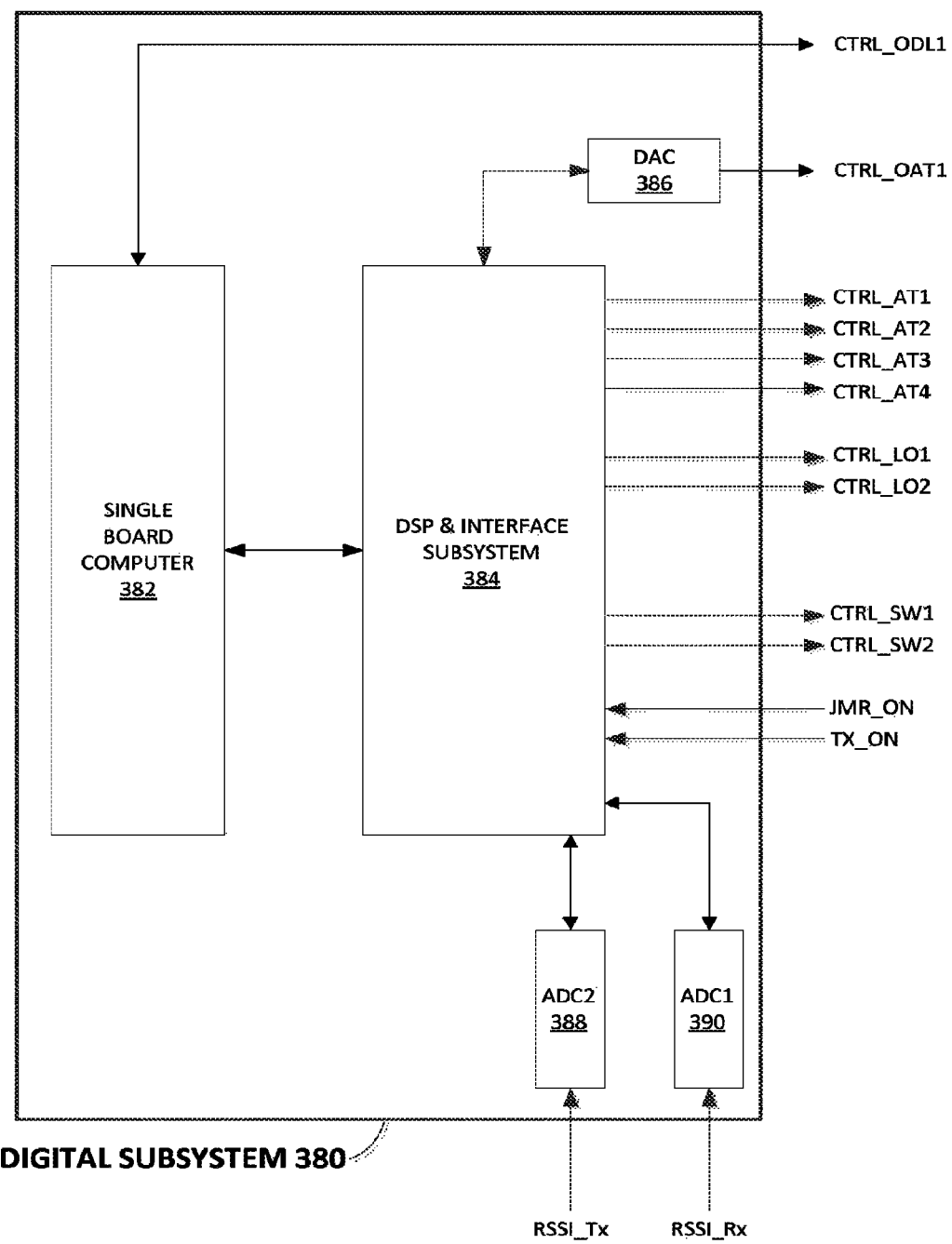
FIG. 3D illustrates an example architecture of a Digital Subsystem of an ICS.

FIG. 3D is a block diagram illustrating example components and example signals associated with Digital Subsystem 380. For example, Digital Subsystem 380 may include one or more field programmable gate array (FPGA)-Digital Signal Processing (DSP) circuits with a plurality of input and/or output (I/O) interfaces (e.g., DSP & Interface Subsystem 384). DSP & Interface Subsystem 384 may be an integrated circuit that may be configured to send and/or receive control signals in order to implement one or more of the methods and techniques described herein. For example, DSP & Interface Subsystem 384 may be configured to send and/or receive control signals to/from Optical Subsystem 350 and/or RF Subsystem 310. DSP & Interface Subsystem 384 may be implemented on a FPGA to implement control logic.

DSP & Interface Subsystem 384 may include Single Board Computer 382. Single Board Computer 382 may include a processor and/or memory. For example, Single Board Computer 382 may be configured to implement one or more of the methods and/or techniques described herein. For example, the memory of the Single Board Computer 382 may include processor readable instructions. The processor readable instructions may be executed by the processor in order to carry out one or more of the control methods described herein. For example, the control methods may include control of one or more RF components of the RF subsystem, control of one or more of the optical components of the optical subsystem, and/or control of components within Digital Subsystem 380 (e.g., DSP & Interface Subsystem 384). The memory of the Single Board Computer 382 may include any tangible and/or physical memory such as random access memory (RAM), read-only memory (ROM), volatile memory, and/or non-volatile memory. For example, the computer readable instructions may be loaded into RAM in the Single Board Computer and the instructions may be executed by the processor in order to perform one or more of the functions and/or methods described herein.

In an example, Digital Subsystem 380 may be configured to convert the signal RSSI_Rx from RF Subsystem 310 from the analog domain to digital domain, for example using an analog-to-digital converter (e.g., ADC1 390). Similarly, Digital Subsystem 380 may be configured to convert the signal RSSI_Tx from Log Amp2 442 of the RF Subsystem from the analog domain to digital domain, for example using an analog-to-digital converter (e.g., ADC2 388). In an example, the digital control signal for one or more of the optical attenuators included in Optical Subsystem 350 may be controlled by Digital Subsystem 380 using control signal CTRL_OAT1. Digital-to-analog converter (DAC) 386 may be utilized in order to control one or more optical attenuators of Optical Subsystem 350. The control signal CTRL_ODL1 may be generated by Single Board Computer 382 for the control of one or more optical delay lines of Optical Subsystem 350. As may be appreciated, although a single control signal for the attenuators of the optical weighting network of Optical Subsystem 350 is shown in FIG. 3D (e.g., CTRL_OAT1), more than one control signal may be used, for example to control the one or more optical attenuators. For example, CTRL_OAT1 may include the signals a_c1, a_c2, . . . , a_cN etc. Similarly, although a single control signal for the delay lines of the optical weighting network of Optical Subsystem 350 is shown in FIG. 3D (e.g., CTRL_ODL1), more than one control signal may be used, for example to control the one or more optical delay lines. For example, CTRL_ODL1 may include the signals t_c1, t_c2, . . . , t_cN etc.

The determination of when to begin or stop cancellation may be based on whether the jammer is currently in operation. For example, Digital Subsystem 380 may be configured to receive the signal JMR_ON from the RF Subsystem. The frequency of operation of the transceiver may be determined and/or measured by the Digital Control Subsystem. For example, the frequency of operation of the transceiver may be determined and/or measured by the Digital Subsystem based on the signal TX_ON, which may be received from the RF Subsystem.

Digital Subsystem 380 may be configured to send the control signals CTRL_SW1 and CTRL_SW2, for example to control Transmit/Receive Bypass Switch 1 and Transmit/Receive Bypass Switch 2, respectively. Digital Subsystem 380 may be configured to control the fast tuning of the first local oscillator (e.g., LON/VCO1 426), for example using control signal CTRL_LO1. Digital Subsystem 380 may be configured to control the fast tuning of the second local oscillator (e.g., LO2/VCO2 428), for example using control signal CTRL_LO2.

Digital Subsystem 380 may be configured to control one or more of attenuation levels of various RF and/or optical attenuators. For example, Digital Subsystem 380 may be configured to control Variable RF Attenuator1 318 in the Jammer RF Front-End component of the RF Subsystem, for example by sending signal CTRL_AT to Variable RF Attenuator1 318. Digital Subsystem 380 may be configured to control Variable RF Attenuator2 324 in the Receive RF Front-End component of the RF Subsystem, for example by sending signal CTRL_AT2 to Variable RF Attenuator2 324. Digital Subsystem 380 may be configured to control Variable Attenuator 3 in the RF Signal Processor component of the RF Subsystem (e.g., Variable Attenuator of Transmit Power Level Detector 342), for example by sending signal CTRL_AT3 to Variable Attenuator 3. Digital Subsystem 380 may be configured to control Variable Attenuator 4 in the Transmit Power Level Detector of the RF Subsystem, for example by sending signal CTRL_AT4 to Variable Attenuator 4.

Figure 4:
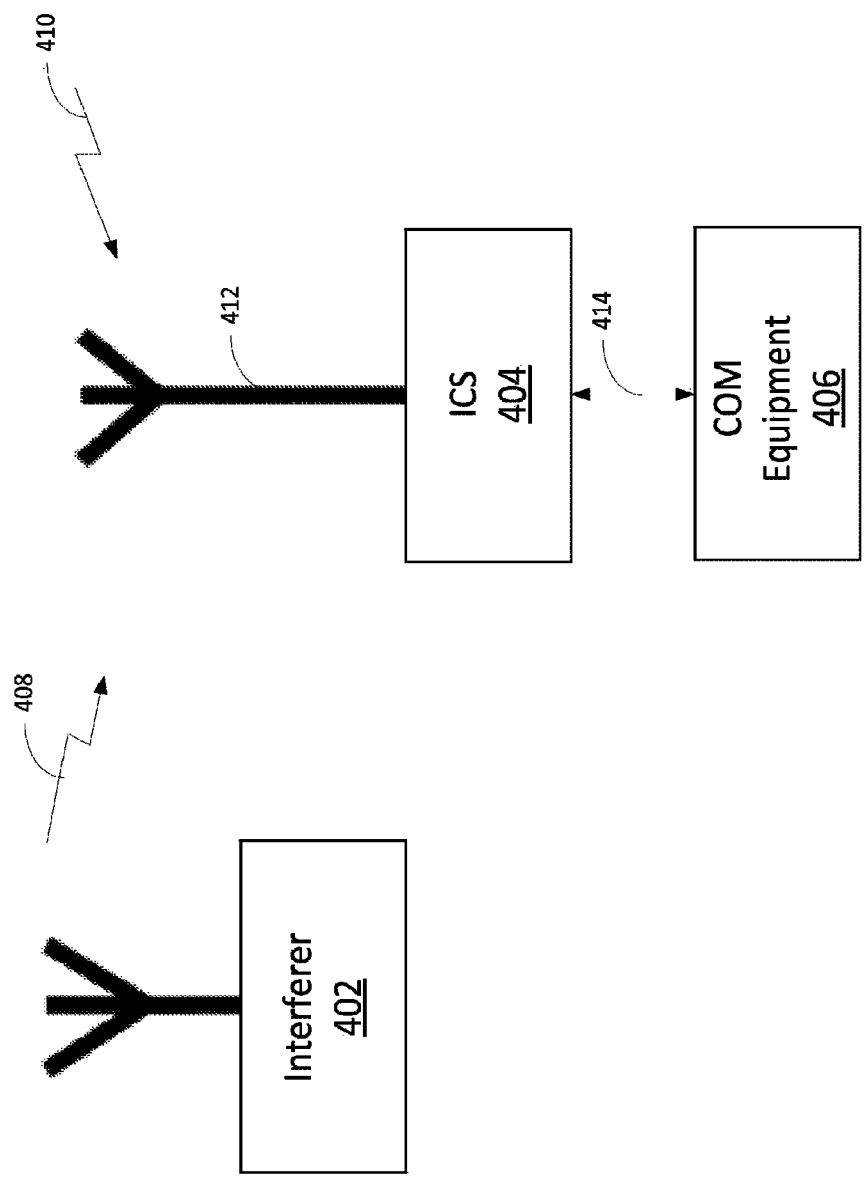
FIG. 4 is a diagram illustrating an example embodiment which integrates the ICS into communications equipment to perform remote interference cancellation.

FIG. 4 is a diagram illustrating an integration of an ICS 404 into or with communications equipment 406 to perform remote interference cancellation. As illustrated in FIG. 4, the ICS 404 may be in communication with communication equipment 406 via a communication link 414. The communication link 414 may be a wireless or wired communication link. The communication link 414 may enable communication of information received at the ICS 404 to be sent to the communication equipment 406 for being provided to a user. The ICS 404 may be inserted into various devices for performing interference cancellation. For example, the ICS 404 may be implemented in a remote interference cancellation system that may be implemented in a handheld and/or man-pack radio (e.g., a JTRS radio).

The ICS 404 may receive a signal of interest (SOI) 410 from a source via antenna 412. The SOI 410 may be a radio frequency (RF) signal desired by a user of the communication equipment 406. The ICS 404 may receive an interfering signal 408 from an interferer 402 via the antenna 412. The interfering signal 408 may include a remote RF signal that may be received from a remote interferer 402. The interfering signal 408 may make reception and/or determination of the SOI 410 at the communication equipment 406 difficult. The ICS 404 may receive the interfering signal 408 during a same time period as the SOI 410 may be received. The ICS 404 may detect the interfering signal 408 and remove the interfering signal 408 from the SOI 410. The ICS 404 may send a clean RF signal via communication link 414 to the communication equipment 414 with which it is associated and/or connected.

Figure 5:
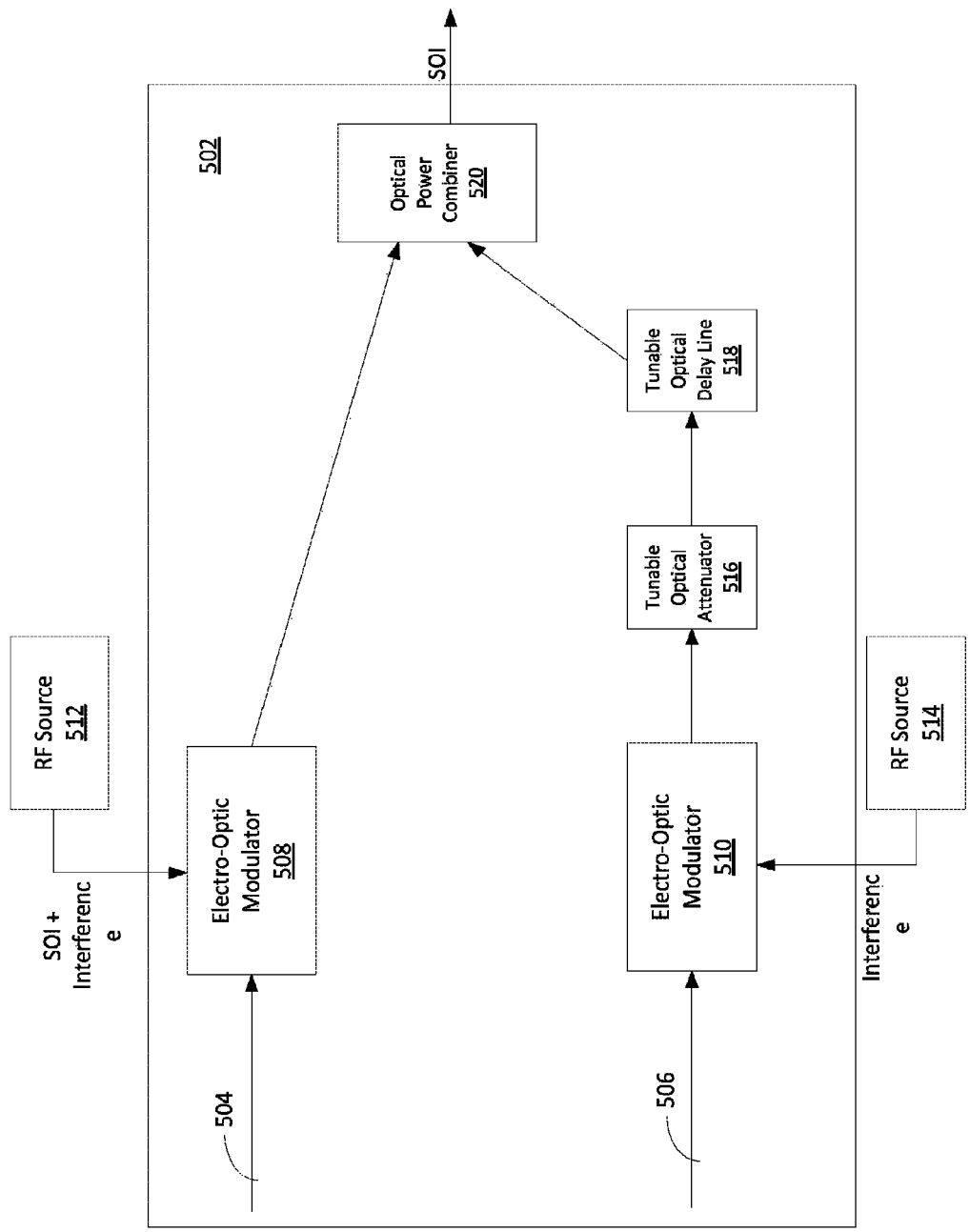
FIG. 5 is a diagram that depicts an example for converting an RF signal to an optical signal for interference cancellation.

FIG. 5 is a diagram that depicts an example for converting an RF signal to an optical signal for interference cancellation. As shown in FIG. 5, an ICS 502 may include electro-optic modulators 508, 510 for converting RF signals to optical signals. The RF signals may be received from RF source 512 and/or RF source 514. The signal received from the RF source 512 may include an SOI and one or more interfering signals. The signal received from the RF source 514 may include the one or more interfering signals for interference cancellation.

The modulators 508, 510 may convert the RF signals to optical signals for optical signal cancellation. Laser signals may serve as optical inputs 504, 506 to electro-optic modulators 508, 510. The ICS 502 may have one or more continuous-wave (CW) lasers that may provide optical power. For example, the CW lasers may provide a power of +15 dBm at wavelengths 1551.61 nm and/or 1551.85 nm. The lasers may be isolated from each other. The modulators 508, 510 may be Ti:LiNbO3 Mach-Zehnder electro-optic modulators.

The transmittance curve of the electro-optic modulators 508, 510 may follow a squared-cosine dependence with respect to voltage. The electro-optic modulator may be, optionally, biased anywhere (e.g., within reasonable voltage limits) on its transmittance curve. The modulator 508 may be biased for positive modulation, such that its operating point may lie in a region of increasing transmittance. The modulator 510 may be biased for negative modulation, such that its operating point lies in a region of decreasing transmittance. Each of these bias points may correspond to 50% transmittance.

A tunable optical attenuator 516 may be implemented to adjust the signal strength of one or more interfering signals for interference cancellation. The tunable optical attenuator 516 may know signal strength at which one or more interfering signals may be received from the RF source 514. The tunable optical attenuator 516 may change the level of the interfering signals that it receives so that the signal strength is the same, or similar, to the signal strength of the interference received from the RF source 512. The tunable optical attenuator 516 may be adjusted to improve the signal strength of received signals for better interference cancellation.

A tunable optical delay line 518 may be implemented to adjust the timing of signals received at the ICS 502 for interference cancellation. The tunable optical delay line 518 may delay one or more received interfering signals so that they may be aligned in time with one or more signals received from the RF source 512. The signals received from the RF source 512, which may be received over the air, may have a larger delay between transmission and receipt than the interfering signals received from the RF source 514, which may be wired transmission that may be coupled directly to the ICS 502. The tunable optical delay line 518 may be used to balance out the distance between the two paths. The tunable optical delay line 518 may be adjusted to improve the timing of received signals for better interference cancellation.

The optical signals may be sent to the optical power combiner 520 for interference cancellation. The interfering signals received from the RF source 514 may be inverted and combined with the signals from the RF source 512, which may include the interfering signals and one or more SOI. When two identical RF signals are sent into the two counter-phase-biased modulators 508, 510 as inputs, combining the two outputs of the modulators may result in cancellation of the RF signals that are modulating the optical carrier waves. The optical power combiner 520 may output a desired SOI without the interfering signals. The SOI may be sent to an Erbium Doped Fiber Amplifier (EDFA) and/or an optical receiver module for further processing.

While the ICS 502 may be depicted with a single optical cancellation path, one or more optical cancellation paths may be implemented in the optical ICS 502. Each optical cancellation path may include a modulator, a tunable delay, and/or a tunable attenuator. The number of optical cancellation paths may depend on the environment in which the optical ICS 502 is implemented. For example, in an environment with buildings or other objects that may cause signal delay, multiple optical paths may be used to capture delayed signals. The optical ICS 502 may include an optical cancellation path per interfering signal or group of interfering signals. The optical ICS 502 may implement each optical cancellation path based on a time period in which one or more interfering signals may be received.

Figure 6:
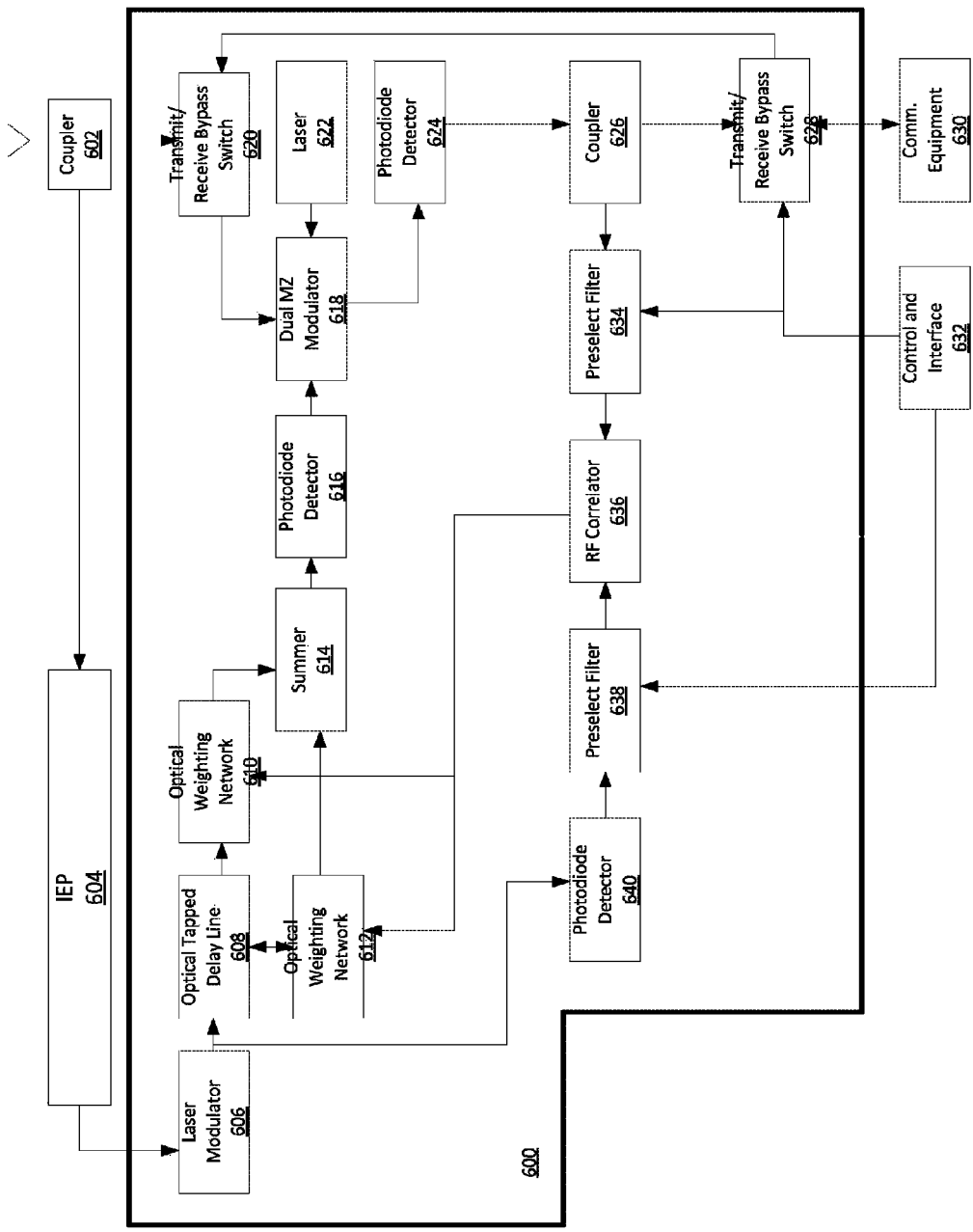
FIG. 6 is a diagram that depicts an example configuration of an ICS for removing multipath signals.

The ICS (e.g., IRP) may have a series of weighting networks (e.g., optical weighting networks) that may be able to modify the interfering signal using a series of time delay and/or amplitude adjustments to account for distortions and/or multipath. FIG. 6 shows an example configuration that includes two weighting networks and may be capable of removing the primary path and/or the $2^{nd}$ multipath signal. An ICS 600 may be configured to remove any number of interference signals. The ICS 600 (e.g., at the IRP) may be rapidly tunable over a wide frequency band. The ICS 600 (e.g., at the IRP) may carry out interference removal over a bandwidth over 100 MHz wide for example.

Blocks within the architecture of FIG. 6 may be similar to blocks with the architecture depicted in FIGS. 3A-3D with equivalent block performing similar functionality. The signal from the Coupler 602 may include the SOI and one or more interfering signals that may be applied to the input of the IEP 604. After re-construction of the signal in the IEP 604, the signal may be applied to the input of the Laser Modulator 606 and may be converted from RF to Optical signal to be applied to the input of the Optical Tapped Delay Line 608 for further processing. After passing through the Optical Weighting Network 610 and/or the Summer 614, the optical signal may be converted back to an RF signal by the Photodiode Detector 616 and may be applied to one input of the Dual Mach-Zehnder Modulator (DPMZ) 618.

The signal from the Coupler 602 may include the SOI and one or more interfering signals and may be applied to the input of the Transmit/Receive Bypass Switch 620. The receive output port of the Transmit/Receive Bypass Switch 620 may be connected to a second input port of the DPMZ 618. The ICS 600 may perform the interference cancellation using a DPMZ 618. The DPMZ 618 may receive input from a Laser 622. The DPMZ 618 may perform RF amplitude and phase tracking with minimal DC offset and reduced distortion using two MZ modulators on an integrated circuit. The RF/180 degree optical (carrier) phase shift may be accomplished with a phase shifter in the optical path following one of the MZ modulators in the DPMZ. With two RF signal inputs, one from Transmit/Receive Bypass Switch 620 and the other from the Photodiode Detector 616, the DPMZ 618 may optically cancel one or more interfering signals, resulting in interference cancellation. This optical ICS 600 may use a Coherent Optical approach which may generate minimal DC offset and may leave no residual DC offset at the output of the Photodiode Detector 624 output.

The interference sample(s) from the Coupler 602 is converted to an optical signal using the Laser Modulator 606. A length of optical cable may provide the interferer sample(s) to the Optical Tapped Delay Line 608 with a delay very close to the antenna coupling delay, to minimize dispersion for broadband cancellation and/or RF isolation. Variable optical attenuators and delays may be used for the Optical Weighting Networks 610 and 612 to achieve the RF phase shift and delays that for interference cancellation. The Optical Weighting Networks 610 and 612 summed output may be applied to the Summer 614 and may be converted back to RF using the Photodiode Detector 616 with minimal distortion. The output of the Photodiode Detector 616 may be combined with the receive output of the Transmit/Receive Bypass Switch 620 in the DPMZ modulator 618 for cancellation of the interfering signal(s). The output of the Photodiode Detector 624 may include the cancelled interfering signal(s) residue plus the desired receive signal SOI, which may be converted back to an RF signal.

A portion of the optical signal at the output of the Laser Modulator 606 may be coupled and converted to RF by the Photodiode Detector 640. This signal may be filtered by the Preselect Filter 638 and may be applied to one of the two inputs of the RF Correlator 636. Any interfering signal present after cancellation at the coupled output of the Coupler 626 after the Preselect Filter 634 may be applied to the second input port of the RF Correlator 636. The two signals, one from the Preselect Filter 638 and one from the Preselect Filter 634 may be compared to each other in the RF Correlator 636. This comparison may cause an RF Correlator 636 output signal, which may be used to control both amplitude and phase of the Optical Weighting Networks 610 and 612. The loop may control amplitude and/or phase for the zero RF Correlator 636 output, which may indicate a completely cancelled interfering signal. Any DC offsets in the control loop may reduce the cancellation attenuation. The interference cancellation attenuation may be a function of the RF Correlator 636 dynamic range.

A Control and Interface Module 632 may control the Preselect Filter 638, the Preselect Filter 634 and/or a Transmit/Receive Bypass Switch. The Transmit/Receive Bypass switch 628 may receive output from the Coupler 626 and may communicate the signal to the Communication Equipment 630 and/or the Transmit/Receive Bypass Switch 620.

FIG. 7A is a graph 700 that illustrates an example RF output power spectrum after passing through an optical ICS. The graph 700 indicates a power level 702 of the signals being received in the power spectrum. The graph 700 indicates a data signal 704, which may be the SOI, that may be of interest to a user of communication equipment.

The RF output power spectrum may be determined from a radio (e.g., embedded CC2420 radio) on a wireless transmitter card. The power spectrum may be measured using a spectrum analyzer. To achieve the power spectrum output indicated in the graph 700, the on-board radio may be transmitting at a center frequency of 2.48 GHz over a 2.28-MHz bandwidth (e.g., IEEE 802.15.14 channel 26) using O-QPSK modulation with DSSS, where the data from the sensor may include the data signal 704. The graph 700 shows that the data signal 704 may be included within the power level 702 of the detected signals at the receiving device.

There are two points 706 and 708 indicated on the power level 702 to illustrate an example of the power level 702 at different points on the graph 700. The power level 702 at the point 706 may be about −93.30 dBm on a 2.48 GHz frequency. The difference between the point 706 and the point 708 may be about −1.50 dB.

Figure 7B:
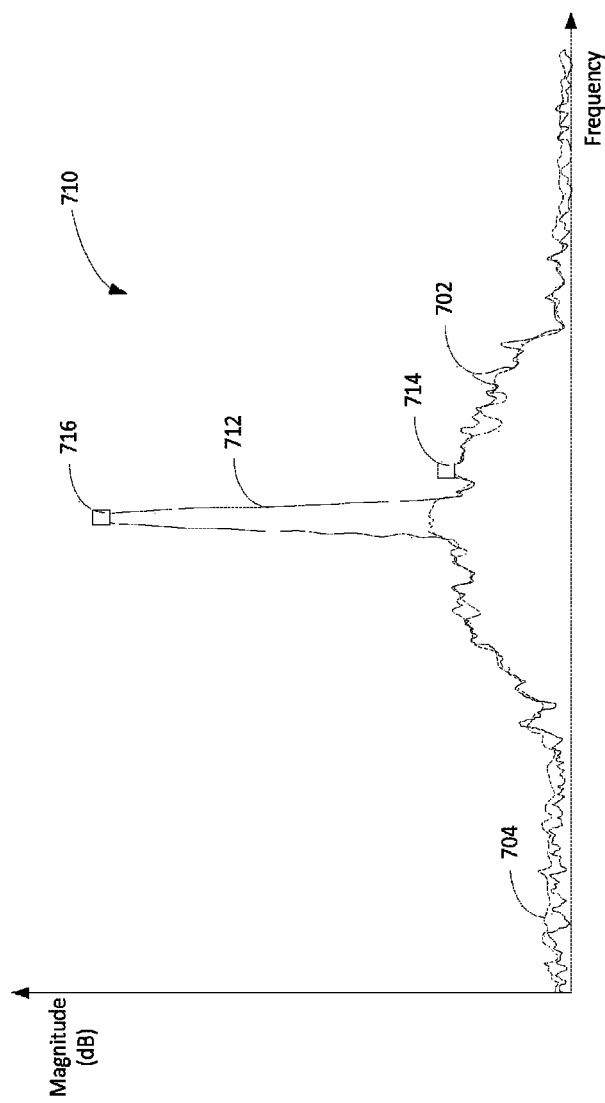

FIG. 7B is a graph 710 that illustrates the example RF output power spectrum as shown in the graph 700 with a jamming/interfering signal 712. The jamming/interfering signal 712 may be detected as a relatively large increase in the power level 702 of the received signals. The jamming/interfering signal 712 may be detected when a portion of the received signals is increased above a threshold when compared to the other received signals. The jamming/interfering signal 712 may be in the center of the power spectrum at 2.48 GHz.

The two points 714 and 716 indicated on the power level 702 illustrate the increase in the power level 702 from the data received in the data signal 704 to the peak of the jamming/interfering signal 712. As shown in the graph 710, the power between the data signal 704 and the jamming/interfering signal 712 may be relatively large. At point 714, the power level 702 of the power spectrum may be about −80.10 dBm on a 2.48 GHz frequency. The difference between the power level 702 at the point 714 corresponding to the data signal 704 and the power level 702 at the point 716 at the peak of the jamming/interfering signal 712 may be about −39.07 dB. The bandwidth of interferer may be about −240 kHz wide.

Figure 7C:
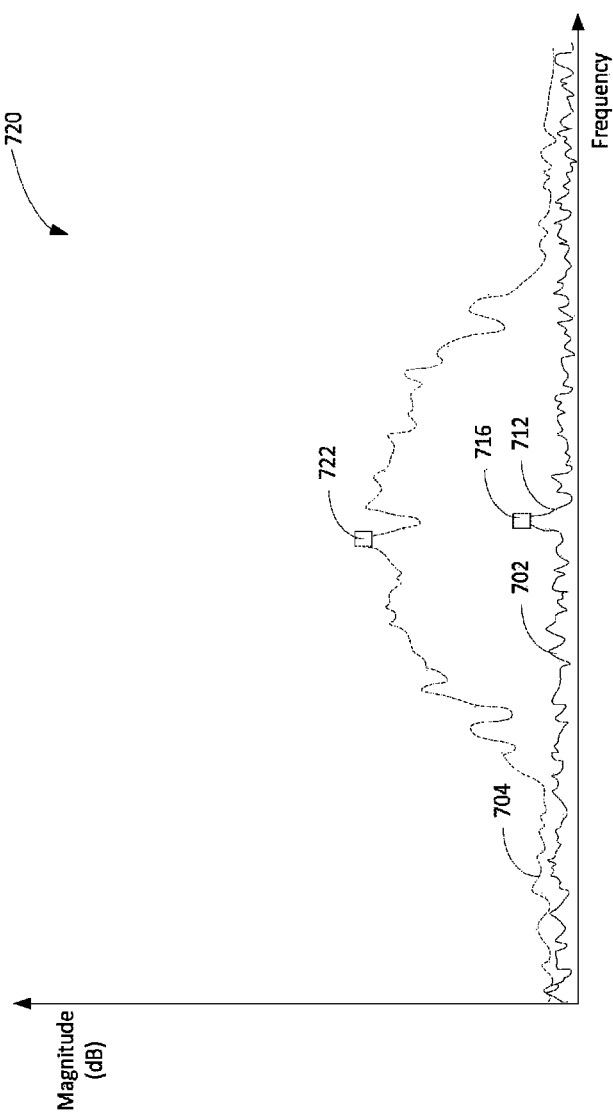

FIG. 7C is a graph 720 that illustrates the power spectrum of the transmitted data that includes the data signal 704 and the cancelled jamming/interfering signal 712 due to the performance of the ICS. As shown in FIG. 7C, the power level 702 of the jamming/interfering signal 712 may be reduced below the power of the data signal 704, such that the data signal 704 may be properly received. In the graph 720, the power level at the point 716 at the peak of the jamming/interfering signal 712 is reduced to about 14.89 dB below the point 722 at the peak power of the data signal 704. Without the optical cancellation of the ICS, the power level 702 of the jamming/interfering signal 712 may be 39.07 dB higher than the data signal 704.

Figure 8A:
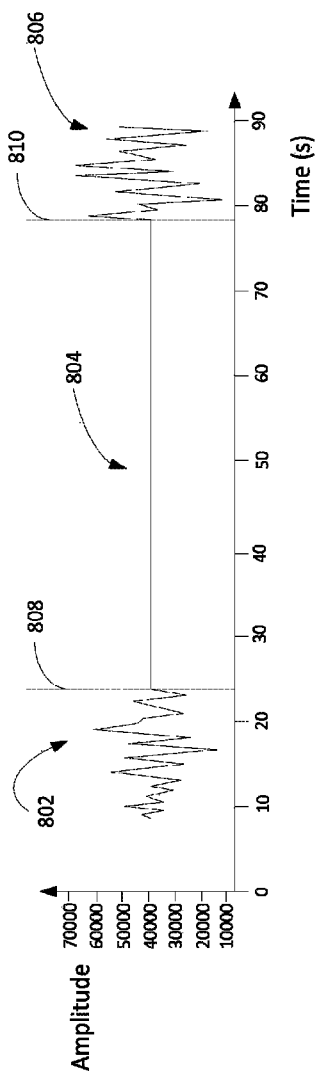
FIGS. 8A and 8B are graphs that show a comparison of outputs when an optical ICS is implemented and when an optical ICS is not implemented.
Figure 8B:
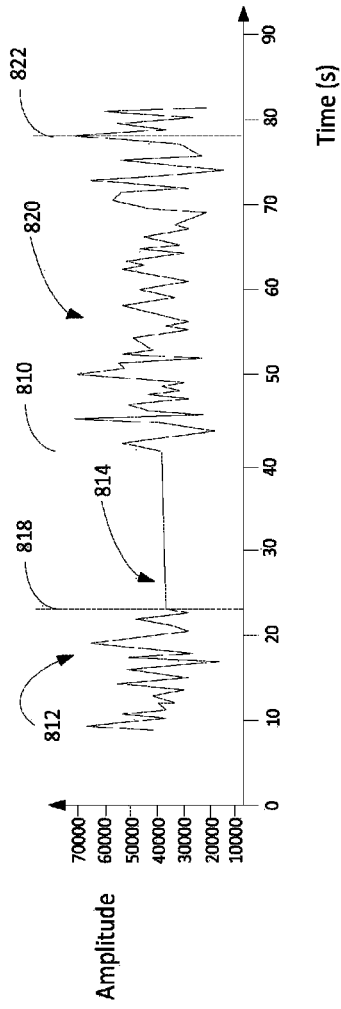

FIGS. 8A and 8B show the effect of the jamming signal on the reception of data at a receiving device. The diagrams show a signal amplitude as a function of time in seconds.

FIG. 8A shows the data reception at a receiver when it is not connected to the optical ICS. At signal portions 802, 806 data is being properly received at the receiver. A jammer may be implemented to jam the signal between start time 808 and end time 810. The receiver may receive the data from a signal, until the jamming signal is received. The signal portion 804 indicates that the jamming signal may prevent data reception between start time 808 and end time 810. The signal portion 804 may be shown as the horizontal line on the concentration-versus-time curve. The signal portion 804 may correspond to a dead time in which no, or little, data may be properly received at the receiver.

FIG. 8B shows the data reception at a receiver when it is not connected to the optical ICS. At signal portions 812, 820 data is being properly received at the receiver. A jammer may be implemented to jam the signal between start time 818 and end time 822. The receiver may receive the data from a signal, until the jamming signal is received. The signal portion 814 indicates that the jamming signal may prevent data reception beginning at start time 818. The signal portion 814 may be shown as the horizontal line on the concentration-versus-time curve. At ICS start time 810, the ICS may be activated to cancel the jamming signal. The dead time may be ended, and data transmission may be resumed, when the ICS is activated at ICS start time 810. The ICS may cancel the jamming signal between ICS start time 810 and end time 822. This may be because the ICS may cancel the jamming signal by a sufficient amount, so that it may no longer have adequate power to disrupt communication from the transmitter to the receiver. The ICS may be deactivated at end time 822, as the jamming signal may not be received after the end time 822. The signal portion 804 may corresponding to a dead time in which no, or little, data may be properly received at the receiver.

Figure 9:
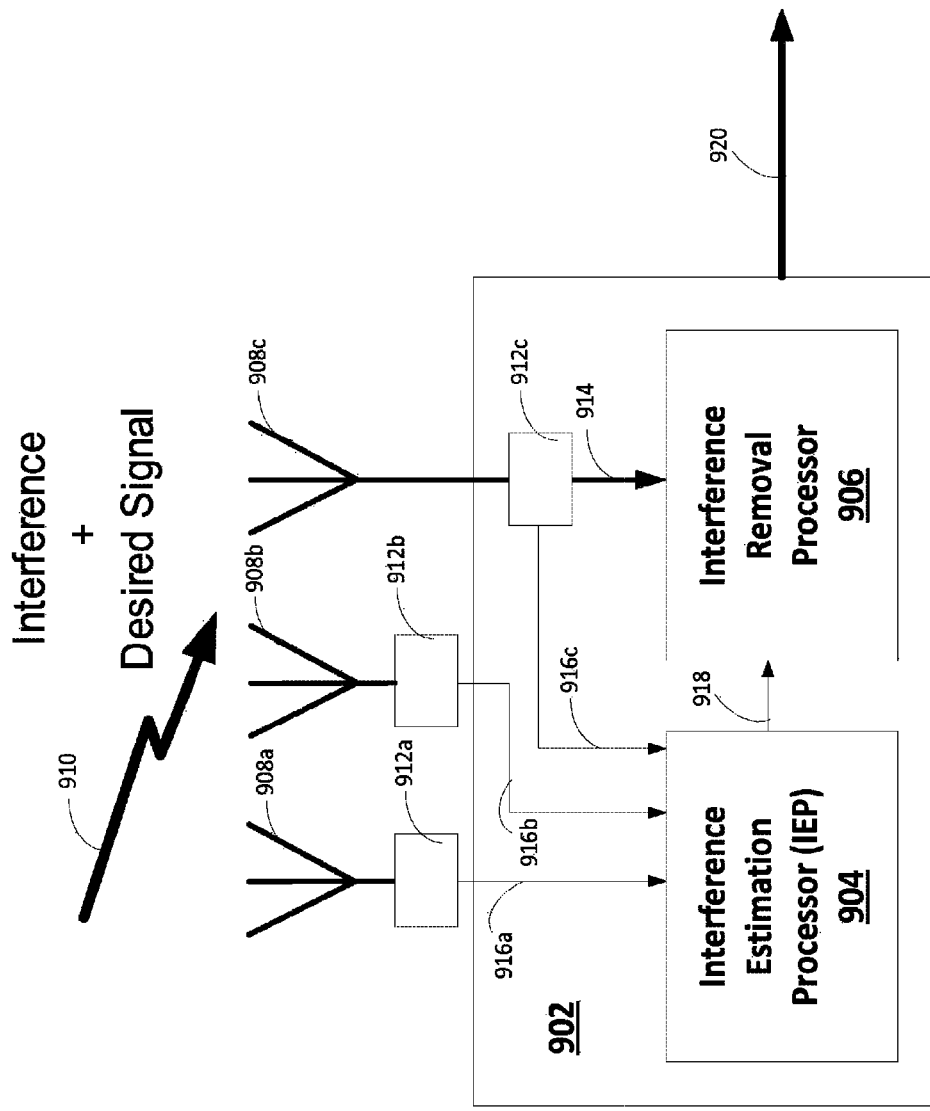
FIG. 9 is a block diagram that depicts an example ICS that includes an interference estimation processor (IEP) and an interference removal processor (IRP).

FIG. 9 is an example diagram that illustrates an example ICS 902 that may be used to determine and/or remove remote interference from received signals. To cancel the interfering signal when the signal is received from a remote and/or unknown location, the ICS may estimate the interfering signal. The interfering signal may be estimated by identification and/or isolation. The estimated interference signal may be cancelled from received signals.

As shown in FIG. 9, the ICS 902 may include an interference estimation processor (IEP) 904 and may include an interference removal processor (IRP) 906. The ICS 902 may receive information via one or more antennas 908a, 908b, 908c. The information may be received via a signal 910. Each antenna 908a, 908b, 908c may send the received signal 910 to a coupler 912a, 912b, 912c. The coupler 912a, 912b, 912c may couple the signals received via a corresponding antenna 908a, 908b, 908c. The signal 910 may include an interfering signal and/or a desired signal, or an SOI. The signal 910 may be passed to the ICS 902 for interference estimation and/or removal.

The IEP 904 and/or the IRP 906 may be used to estimate and/or remove the interference. The interference within the signal 910 may be received from a remote source, which may be unknown to the ICS 902. Inside the ICS 902, the core signal 910 may be sent (e.g., directly) to the IRP 906 via communication link 914. A sample of the signal 910 may be sent to the IEP 904 via one or more of the communication links 916a, 916b, 916c. The sample may be taken by a coupler 912a, 912b, 912c, which may be in the ICS 902 or external to the ICS 902, for example. The IEP 904 may isolate the interfering signal using time and/or spatial diversity, which may be combined with statistical processing. The isolated interference signal may be sent to the IRP 906 via the communication link 918.

The IRP 906 may subtract the interfering signal from the signal 910 received (e.g., directly) via the communication link 914. The IRP 906 may subtract the interfering signal from the signal 910 using optical signal cancellation. Because the IRP 906 may utilize optics, the IRP 906 may process a very wide bandwidth signal, such as a bandwidth signal with up to 150 MHz bandwidth for center frequencies of up to 20 GHz. An optical processor in the IRP 906 may be rapidly tuned to handle any frequency utilizing the same core components. After removal of the interference from the received signal 910, the desired SOI may be output at 920. Because interferers may appear and disappear sporadically, the ICS 902 may adapt to mitigate emerging interference with minimal communication down time.

Figure 10A:
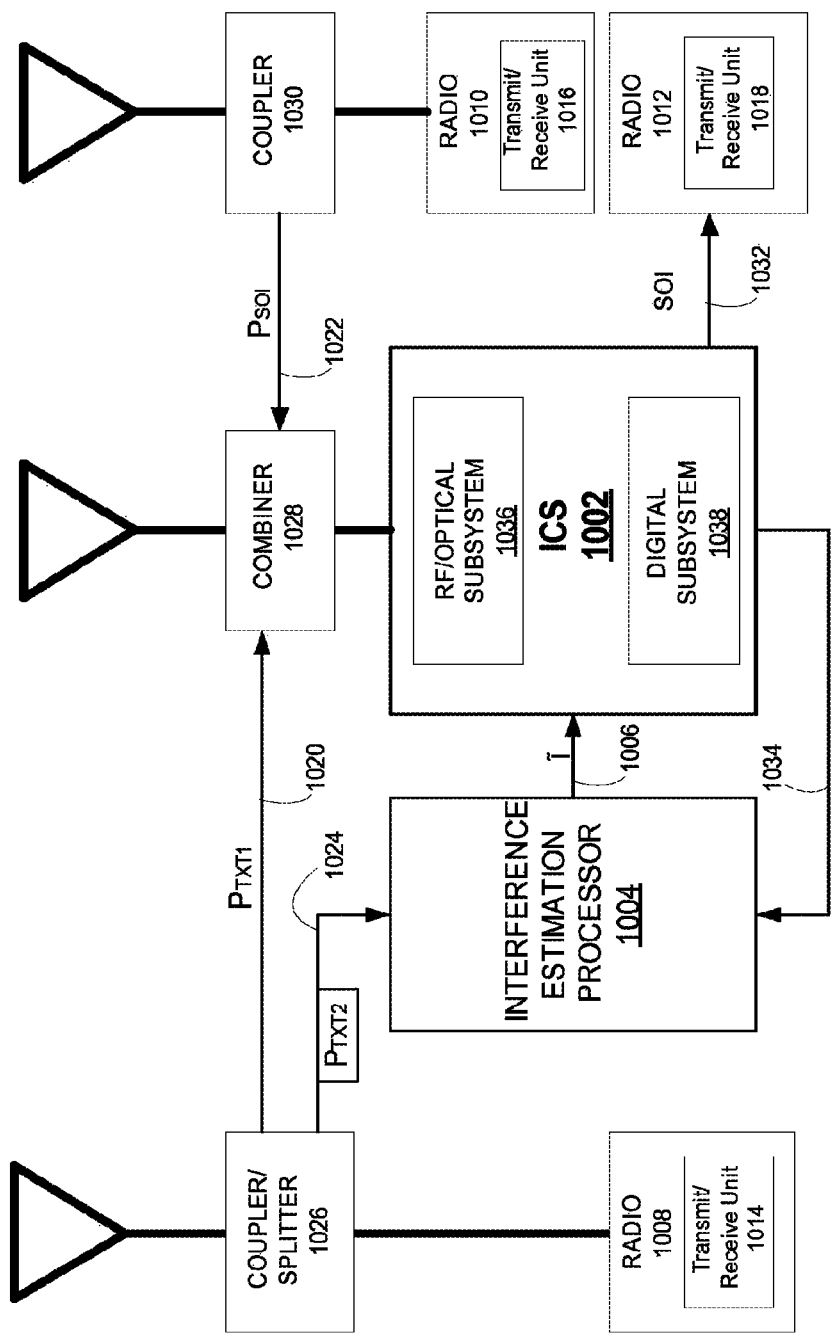
FIGS. 10A and 10B are block diagrams that depict example system architectures that may be implemented for performing remote interference cancellation using an IEP.
Figure 10B:
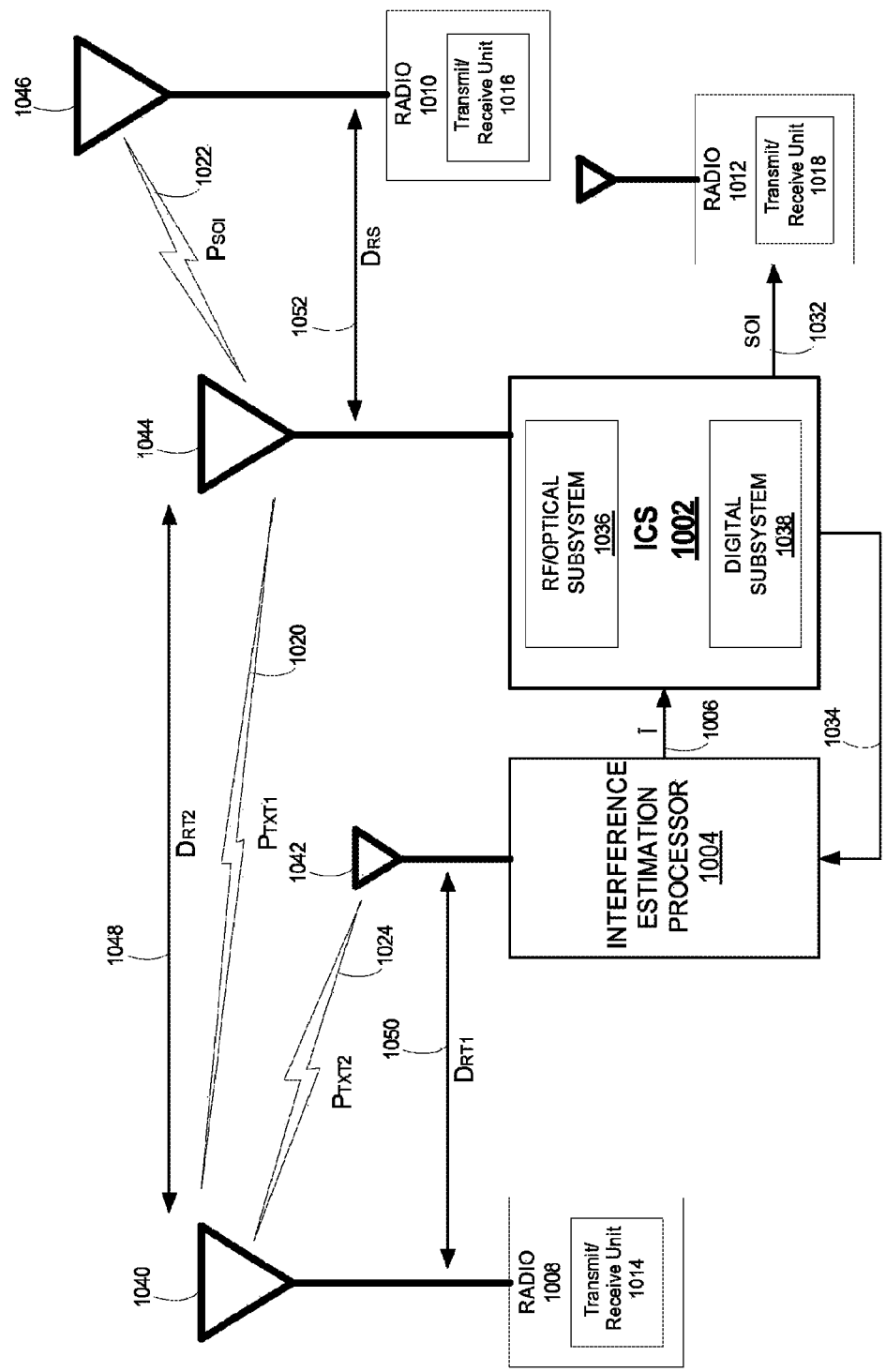

FIGS. 10A and 10B are diagrams that illustrate example embodiments of system architectures that may be implemented for performing remote interference cancellation. As shown in FIGS. 10A and 10B, the remote interference cancellation may be performed using an ICS 1002 and/or an IEP 1004. FIG. 10A is a diagram that illustrates a cabled setup architecture, in which remote communications may be received via wire-line communications. FIG. 10B is a diagram that illustrates an over-the-air setup architecture, in which remote communications may be received via wireless communications.

The example architectures shown in FIGS. 10A and 10B may be implemented, through hardware and/or software, to provide interference mitigation (e.g., RF interference mitigation, satellite communications (SATCOM) interference mitigation, etc.), such as where no prior knowledge of an interference signal may be available. The IEP 1004 may be configured to detect, isolate, and/or regenerate an interfering signal 1006 from the received interfering signal 1024. Once the IEP 1004 detects, isolates, and/or regenerates an interfering signal 1006, the interfering signal 1006 may be input to the ICS 1002. The ICS 1002 may remove the interfering signal 1006 from the received signals having both the SOI as well as the interfering signal 1006.

As shown in FIGS. 10A and 10B, the ICS 1002 may receive the SOI 1022 from a transmit/receive unit 1016 at radio 1010. The SOI 1022 may be sent via coupler 1030. The ICS 1002 may receive one or more interfering signals, such as the interfering signal 1020 from the transmit/receive unit 1014 at radio 1008. The radio 1008 may reside at a remote and/or unknown location from the ICS 1002 or device in which the ICS 1002 resides. The SOI 1022 and/or the interfering signal 1020 may be received via a combiner 1028 that may be capable of combining the SOI 1022 and the interfering signal 1020 and sending the combined signal to the ICS 1002.

The IEP 1004 may detect the interfering signal 1024, or a sample thereof, from the radio 1008 of the interferer. The interfering signal 1024 may be the same as the interfering signal 1020. The interfering signal 1020, 1024 may be provided by the radio 1008 via the coupler/splitter 1026. The IEP 1004 may provide an interference estimation 1006 of the interfering signal 1024 to the ICS 1002 for cancellation. The ICS 1002 may cancel the interference based on the interference estimation 1006 provided by the IEP 1004. The ICS 1002 may provide the SOI 1032 as output. The interference may be cancelled using the RF/Optical subsystem 1036. The SOI 1032 may be provided to a transmit/receive unit 1018 of a radio 1012, for example.

The ICS 1002 may include a digital subsystem 1038. The IEP 1004 and/or ICS 1002 may include a field-programmable gate array (FPGA) development board, a data conversion card, an analog-to-digital converter (ADC) board (e.g., 18-bit), and/or a digital-to-analog converter (DAC) board (e.g., 14-Bit). The data conversion card may include channels of ADC and DAC (e.g., 14-bit), with 150 MS/s and 275 MS/s respectively. The DSP model may be converted to the platform FPGA design, which may include a control software implementation. The FPGA components and/or SW components may be implemented in the ICS 1002 and/or the IEP 1004.

The interference may be mitigated multiple times using the ICS 1002 and/or the IEP 1004. For example, the interference may be mitigated from the combined SOI 1022 and the interfering signal 1020 when the power level of the interfering signal 1020, which may be referred to as $P_{TXT1}$, and/or the interfering signal 1024, which may be referred to as $P_{TXT2}$, is greater than the power level of the SOI 1022, which may be referred to as $P_{SOI}$. $P_{TXT1}$ may be the same or different from $P_{TXT2}$. When the power level of the interfering signal has been mitigated at the ICS 1002 but exceeds a threshold, the ICS 1002 may send the signal via the communication path 1034 to the IEP 1004 for another iteration of interference mitigation. This may be performed multiple times until the interference power level is below a threshold.

As shown in FIG. 10B, the IEP 1004 and the ICS 1002 may receive signals via antennas 1042 and 1044, respectively. The radio 1008 may transmit interfering signals 1020, 1024 via an antenna 1040. The radio 1010 may transmit the SOI 1022 via an antenna 1046. The antenna 1042 for the IEP 1004 and the antenna 1044 for the ICS 1002 may be directional antennas that may enable the IEP 1004 to detect signals from given direction at a time instance.

The IEP 1004 and/or the ICS 1002 may detect the distance from which signals may be received. The IEP 1004 may detect the distance $D_{RT1}$ 1050 from which the interfering signal 1024 may be received. The ICS 1002 may detect the distance $D_{RT2}$ 1048 from which the interfering signal 1020 may be received and/or the distance $D_{RS}$ 1052 from which the SOI 1022 may be received. The distance from which the interfering signals 1020, 1024 may be received may be different from the distance from which the SOI 1022 may be received. For example, the distance from which the interfering signals 1020, 1024 may be received may be greater than or less than the direction from which the SOI may be received. The SOI 1022 may have a different SIR than the interfering signals 1020, 1024.

Figure 11:
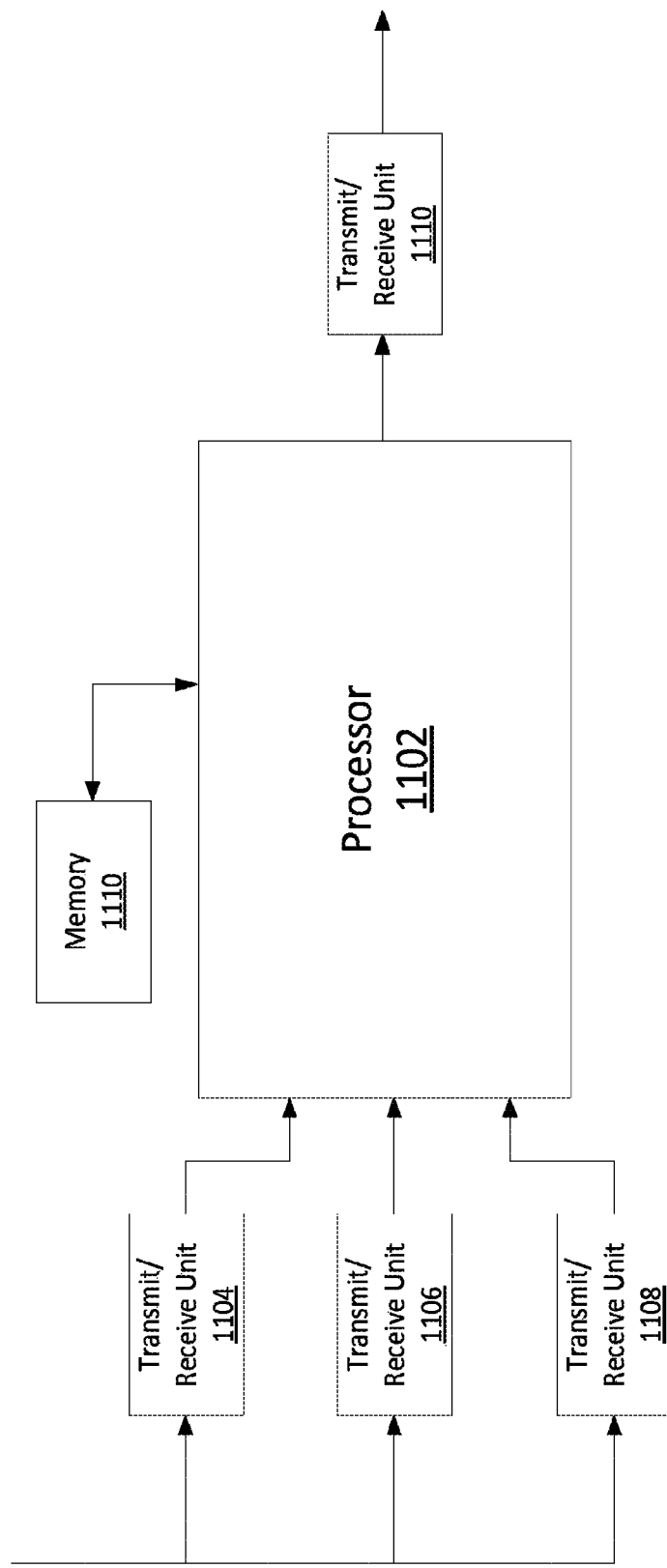
FIG. 11 is a block diagram that depicts an example system architecture for an IEP and/or an ICS.

FIG. 11 shows an example of portions of hardware that may be implemented for signal processing. The example portions of hardware shown in FIG. 11 may be incorporated in the IEP, the ICS, and/or the device in which the IEP and/or ICS may be implemented. As shown in FIG. 11, input may be received from one or more sources via transmit/receive units 1104, 1106, and/or 1108. The transmit/receive units 1104, 1106, and 1108 may each include a transmitter, a receiver, a transceiver, or other communications module capable of receiving and/or transmitting wireless and/or wire-line communications. The input into the transmit/receive units 1104, 1106, and/or 1108 may include one or more RF signals, such as an interference signal and/or an SOI, for example.

The signal processor 1102 may receive the signals from the transmit/receive units 1104, 1106, and/or 1108 and may process the signals for being output via the transmit/receive unit 1110. The signal processor may include a general purpose processor, a special purpose processor, a conventional processor, a digital signal processor ("DSP"), a plurality of microprocessors, one or more microprocessors, a controller, a microcontroller, Application Specific Integrated Circuits ("ASICs"), Field Programmable Gate Array ("FPGA") circuits, any other type of integrated circuit ("IC"), or the like. The processor 1102 may perform signal coding, data processing, input/output processing, and/or any other functionality that enables the device implementing the processor 1102 to operate as described herein. While FIG. 11 depicts the processor 1102 and the transmit/receive units 1104, 1106, 1108, and 1110 as separate components, processor 1102 and one or more of the transmit/receive units 1104, 1106, 1108, and 1110 may be integrated together, such as in an electronic chip for example.

The processor 1102 may communicate with memory 1110 to store and/or retrieve instructions. The memory 1110 may include a non-removable memory and/or a removable memory. The non-removable memory may include random-access memory ("RAM"), read-only memory ("ROM"), a hard disk, or any other type of memory storage device. The removable memory may include a subscriber identity module ("SIM") card, a memory stick, a secure digital ("SD") memory card, and/or the like.

Figure 12:
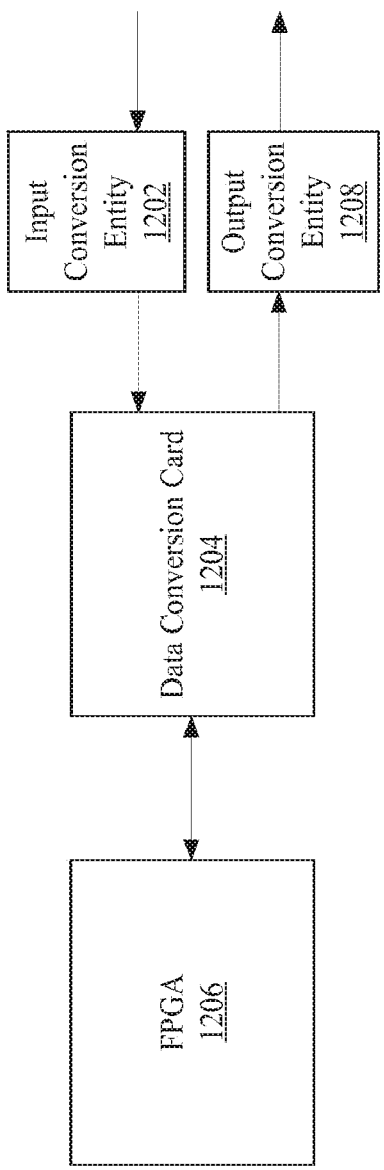
FIG. 12 is a block diagram of example modules that may be implemented in the IEP and/or ICS.

FIG. 12 shows another example of hardware that may be implemented for signal processing. The example hardware shown in FIG. 12 may be incorporated in the IEP, the ICS, and/or the device in which the IEP and/or ICS may be implemented. The hardware shown in FIG. 12 may be implemented for wideband interference optimization.

As shown in FIG. 12, input may be received at the input conversion entity 1202. The input may include a signal from one or more sources. The input conversion entity 1202 may convert the received input for processing. For example, the input conversion entity 1202 may be an ADC. The converted signal may be sent to a data conversion card 1204. The data conversion card 1204 may convert the signal to data for processing and may send the data to the FPGA 1206 for processing.

The FPGA 1206 may process the data as described herein and may send the processed information to the data conversion card 1204. The data conversion card 1240 may convert the data to a signal and send the signal to the output conversion entity 1208. The output conversion entity 1208 may convert the received signal for being output to one or more destinations. For example, the output conversion entity 1208 may be a DAC. The converted signal may be sent to one or more destinations after conversion.

Figure 13:
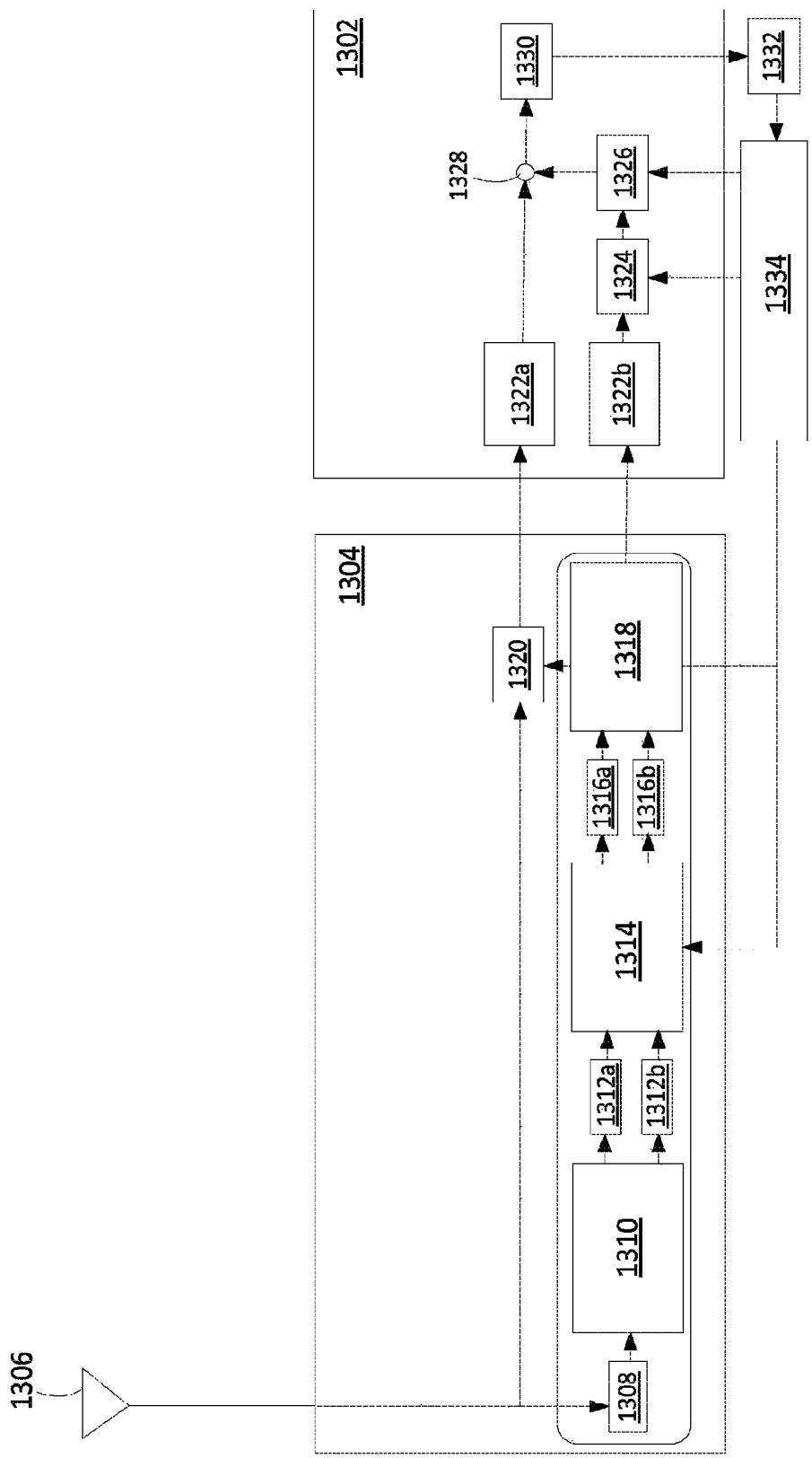
FIG. 13 is a block diagram of other example modules that may be implemented in the IEP and/or ICS.

FIG. 13 illustrates an example architecture for narrowband interference cancellation. FIG. 13 shows an ICS 1302 and an IEP 1304. The ICS 1302 and/or the IEP 1304 may be implemented to remove narrowband interference for wideband channels (e.g., UHF SATCOM channels). The ICS 1302 may be a hybrid electro-optical ICS 1302.

As shown in FIG. 13, signal processing may be used to isolate a narrowband interference signal received via the antenna 1306. The signal received via the antenna 1306 may include the SOI and/or an interference signal. The received signal may be sent to the band-pass filter (BPF) 1308 and/or the RF delay module 1320. The BPF 1308 may send the received signal to a down conversion receiver 1310. The down conversion receiver 1310 may send the signal to an ADC 1312*a* and/or an ADC 1312*b* for analog to digital conversion. The digital signal may be sent to the processor 1314, which may include an FPGA, for estimating the interference signal. The interference signal may be sent to a DAC 1316*a* and/or DAC 1316*b* for digital to analog conversion. The DAC 1316*a* and/or DAC 1316*b* may send the analog signal to the up conversion transmitter 1318.

The IEP 1304 may send the signal received from the antenna 1306, which may include the combined SOI and the interference signal, and/or the estimated interference signal to the ICS 1302 for cancellation. For example, the RF delay module 1320 may send the signal received from the antenna 1306 to the optical transmission module 1322*a* and the up conversion transmitter 1318 may send the interference signal to the optical transmission module 1322*b*. The RF delay module 1320 may delay the transmission of the RF signal to the ICS 1302 for a period of time to enable the estimation of the interference within the received signal. The optical transmission module 1322*a* and the optical transmission module 1322*b* may convert the received signals to optical signals for cancellation of the interference signal.

The ICS 1302 may use the optical signals to cancel the interference signal. The optical transmission module 1322*b* may invert the optical interference signal. The inverted optical interference signal may be sent to the attenuation module 1324 for attenuating the amplitude. The inverted optical signal may be sent to the optical delay module 1326 for delaying the time of combining the signals. The inverted optical signal may be combined with the optical signal that includes the SOI and the interference signal at 1328. The inverted interference signal may cancel the amount of interference estimated at the processor 1314 when combined with the other optical signal at 1328. The filtered optical signal may be sent to the optical receiver module 1330 for being converted for transmission. The optical receiver module may convert the optical signal to an RF signal for example.

The estimated interference may be cancelled from the received signal one or more times to filter out the interference. The signal may be filtered a predetermined number of times or until the SNR reaches a threshold. The RF receiver 1332, which may be an ultra-wideband (UWB) receiver, may receive the filtered signal and may send the filtered signal to a received signal strength indication (RSSI) feedback control board 1334. The RSSI feedback control board 1334 may measure a power of the received signal and may determine whether to continue to filter the signal based on the total power of the signal. The RSSI feedback control board 1334 may assume that if the total power of the signal is above a threshold, such as a power threshold at which data may be received, the signal includes additional interference. The RSSI feedback control board 1334 may send the filtered signal to the IEP 1304 for further processing. For example, the RSSI feedback control board 1334 may send the filtered signal to the processor 1314 for interference estimation and/or the RF delay module 1320. The RSSI feedback control board 1334 may send information to the ICS 1302 to aid in cancellation. For example, the RSSI feedback control board 1334 may send information to the attenuation module 1324 and/or the optical delay module 1326.

The IEP 1304 may be implemented based on temporal diversity. In the IEP 1304, the wideband signal may be separated from the narrowband signal based on the different statistical properties of the two types of signal. A wideband signal may have a relatively flat spectrum and may be difficult to accurately predict based on its past values without any knowledge of the property of the signal. A narrowband interferer may be accurately estimated from previously received values. The received signal may be represented by Equation (1):

$$r(t)=s(t)+i(t)+n(t),\quad\text{Equation (1)}$$

where s(t) may represent the SOI in ultra wideband, i(t) may represent narrowband interference, and n(t) may represent white Gaussian noise, with N(0, $\sigma^2$). If r(t) is sampled at the bandwidth of the narrowband signal, the j-th sample may be represented as shown in Equation (2):

$$r_j=s_j+i_j+n_j\quad\text{Equation (2)}$$

Successive samples of the interfering signal may be highly correlated. i(t) may be accurately predicted. With a linear FIR predictor, the estimated interferer may be represented as shown in Equation (3):

$$i_j \approx \tilde{r}_j = \sum_{l=1}^{L} a_l r_{j-l},\quad\text{Equation (3)}$$

where, a may be a filter coefficients vector that may have L taps. The coefficients may be updated from the computed error signal $e_j=(r_j-\tilde{r}_j)$, for example with least mean square algorithm, $$a_j=a_{j-1}+\mu(r_j-\tilde{r}_j)r_j,\quad\text{Equation (4)}$$

where μ may be the step-size parameter and may control the convergence characteristics of the least mean square algorithm.

Many algorithms may be used to estimate the interference signal. The algorithm may depend on the type of narrowband signal. The IEP 1304 may adapt to different algorithms to perform cancellation more accurately. The linear FIR predictive technique may be implemented with the least mean square adaptive algorithm. This predictive technique may be adapted with high stability.

Figure 14:
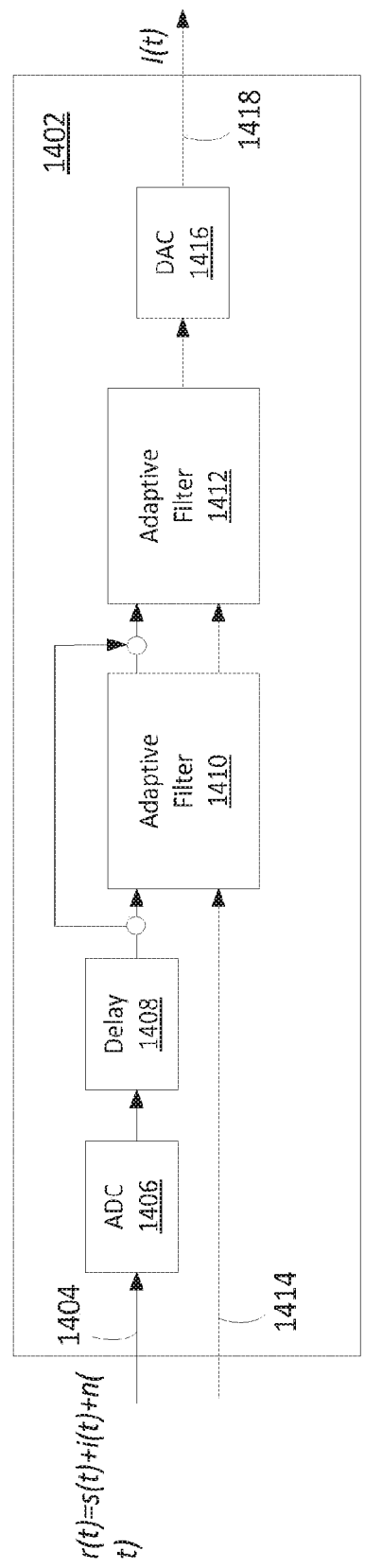
FIG. 14 is a block diagram that depicts an example architecture for narrowband interference cancellation.

FIG. 14 is a diagram that illustrates example functions that may be performed by an IEP 1402. As illustrated in FIG. 14, the IEP 1402 may comprise multiple adaptive filters. The IEP 1402 may receive a signal at 1404 that may include the SOI and remote interference. The signal may be represented by Equation 1, where s(t) may represent the SOI, i(t) may represent the interference, and n(t) may represent white Gaussian noise. The IEP 1402 may send the signal to an ADC 1406. The signal may be delayed by the delay module 1408 and/or passed through one or more adaptive filters 1410, 1412. The one or more adaptive filters 1410, 1412 may include a self-adjusting filter that may adjust its function according to an optimization algorithm driven by an error signal.

A reference signal 1414 may be passed through the one or more adaptive filters 1410, 1412. The reference signal may be a desired signal having a desired signal strength without interference. The adaptive filters 1410, 1412 may be adaptive least mean square (LMS) filters. The one or more adaptive filters 1410, 1412 may determine the interference or the interference level based on the difference between the received signal 1404 and the reference signal 1414. The resulting filtered signal may be passed through a DAC 1416. The output signal 1418 may comprise an estimation of the interference i(t) received in the signal 1404.

The performance of the IEP 1402 may be dependent on the quantization accuracy with the number of bits in the ADC 1406. This, in turn, may depend on the signal-to-interference strength. The one or more adaptive filters 1410, 1412 may accurately track a sinusoidal signal. The architecture may perform differently for a modulated signal. A modulated signal may not be a pure sinusoidal signal and may not be tracked as accurately as in the sinusoidal signal. The amplitude and/or phase of this type of signal may be modulated. The waveform may not be periodic in amplitude and phase to allow for the detection of amplitude minima and maxima, phase and frequency accurately. Different types of algorithm and multiple adaptive filters may be implemented for accurate estimation and/or re-generation of the received modulated interference signal i(t). Various forms of modulated waveforms may be stored in the memory of the IEP 1402 for reference and comparison with the re-generated interference signal 1418 for accuracy. The two adaptive filters 1410, 1412 may be used to better track the interference signal with data modulation.

The spectrum of example signals entered into and output via the IEP are shown in FIGS. 15A and 15B. The graphs shown in FIGS. 15A and 15B illustrate an example magnitude squared (dB) and frequency (GHz) of signals 1502 and 1504, respectively. The signal 1502 depicts a graphical representation of an example signal that may be input into the IEP. The signal 1502 may include the SOI and the interference signal. The interference within the signal 1502 is illustrated as the large increase in magnitude near the center of the frequency. The magnitude of the interference in the signal 1502 may be about 60 dB greater than the magnitude of the data within the signal of interest. The interference within the signal 1502 may be determined by the IEP and may be sent to the ICS for cancellation.

The signal 1504 may depict a graphical representation of a signal that may be output by the ICS after cancellation. The ICS may receive the signal 1502 and the estimated remote interference within the signal 1502. The ICS may perform cancellation of the interference within the signal 1502 to produce the signal 1504, which may include the SOI.

Figure 16B:
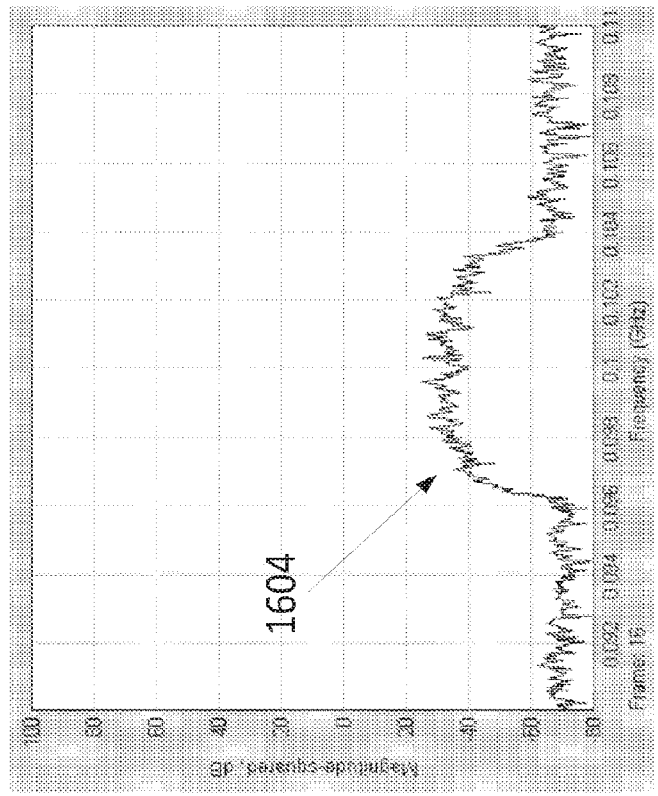
FIGS. 16A and 16B are graphs that show another example signal input into the IEP and a signal output after cancellation.
Figure 16A:
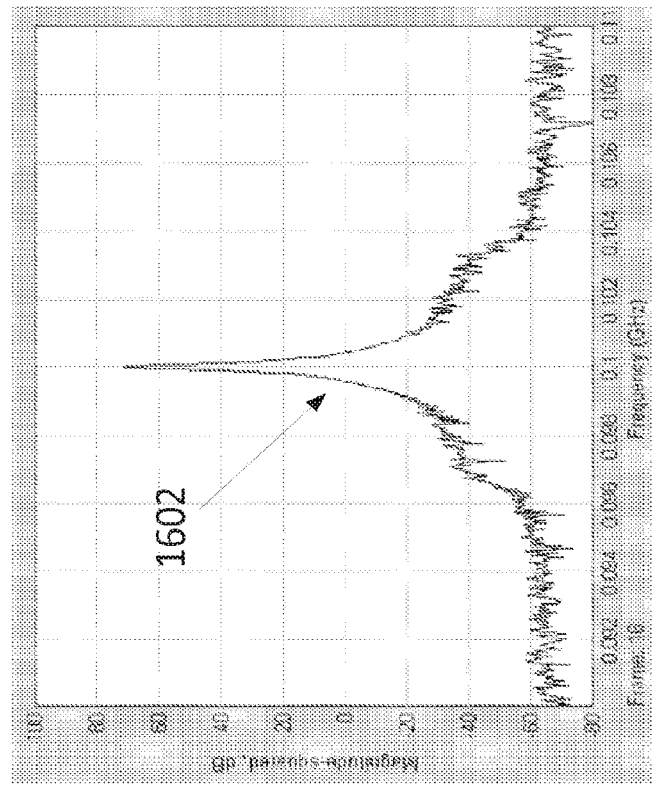

The graphs shown in FIGS. 16A and 16B illustrate another example magnitude squared (dB) and frequency (GHz) of signals 1602 and 1604, respectively. The signal 1602 depicts a graphical representation of an example signal that may be input into the IEP. The signal 1602 may include the SOI and the interference signal. The interference within the signal 1602 is illustrated as the large increase in magnitude near the center of the frequency. The magnitude of the interference in the signal 1602 may be about 100 dB greater than the magnitude of the data within the signal of interest. The interference within the signal 1602 may be determined by the IEP and may be sent to the ICS for cancellation.

The IEP may estimate the frequency of the interference for the adaptive filter. According to an example embodiment, the IEP may implement an algorithm to provide an estimation for SNR scenarios. The algorithm may be a method of moments algorithm. The method of moments may be used for finding statistical estimators of unknown parameters of a probability distribution from results of observations. The moments of an empirical distribution may be determined by sample moments, which may be equal in number to the number of parameters to be estimated. The moments may be equated to the corresponding moments of a probability distribution, which may be functions of unknown parameters. A system of equations may be obtained and may be solved for the parameters, which may then be considered the required estimates. The estimation may be used for high SNR scenarios with low computational complexity. The algorithm implemented by the IEP may be described as follows:

$$r(t) = i(t) + n(t) \quad \text{Equation (5)}$$

$$r(t) = A\cos(2\pi f_c t + \phi) + n(t) \quad \text{Equation (6)}$$

where r(t) may represent the received signal, i(t) may represent the narrowband interference with the center frequency $f_c$ and amplitude A, n(t) may represent an ultra-wideband signal as white Gaussian noise, $\sim N(0, \sigma^2)$, and/or the phase $\phi$ may be uniformly distributed, $\sim U[0, 2\pi]$. The sampled signal may be represented as $$r[k] = A\cos(2\pi f_c k + \phi) + n[k] \quad \text{Equation (7)}$$

The autocorrelation of i(t), and n(t) after question expansion and integration may be $$\begin{aligned} R_{ii}[j] &= E\{i[k]i[k+j]\} \quad \text{Equation (8)} \\ &= E\{A\cos(2\pi f_c k + \phi)A\cos(2\pi f_c(k+j) + \phi)\} \\ &= \frac{A^2}{2}\int_0^{2\pi}\cos(4\pi f_c k + 2\pi f_c j + 2\phi) + \cos(2\pi f_c j)d\phi \\ &= \frac{A^2}{2}\cos(2\pi f_c j) \end{aligned}$$

$$R_{nn}[j] = \sigma^2\delta[j] \quad \text{Equation (9)}$$

if $j = 1$, then $$R_{rr}[1] = \frac{A^2}{2}\cos(2\pi f_c) + \sigma^2 \quad \text{Equation (10)}$$

The normalized estimated frequency with respect to the sampling frequency may be represented as $$\begin{aligned} \tilde{f} &= \frac{1}{2\pi}\arccos\left(\frac{\tilde{R}_{rr}[1]}{A^2/2}\right) \quad \text{Equation (11)} \\ &= \frac{1}{2\pi}\arccos\left(\frac{\frac{1}{N-1}\sum_{n=0}^{N-1}r[k]r[k+1]}{\frac{1}{N}\sum_{n=0}^{N-1}r^2[k]}\right) \end{aligned}$$

The performance of the algorithm shown above may be implemented for different SNR and sampling rates. FIG. 17 is a graph that illustrates an estimated center frequency 1702 in MHz for an SNR from 0-60 dB. The estimated center frequency 1702 may be about 350 MHz. The graph in FIG. 17 shows that the estimation may be accurate for SNR greater than about 20 dB, but is not limited as such.

Figure 18:
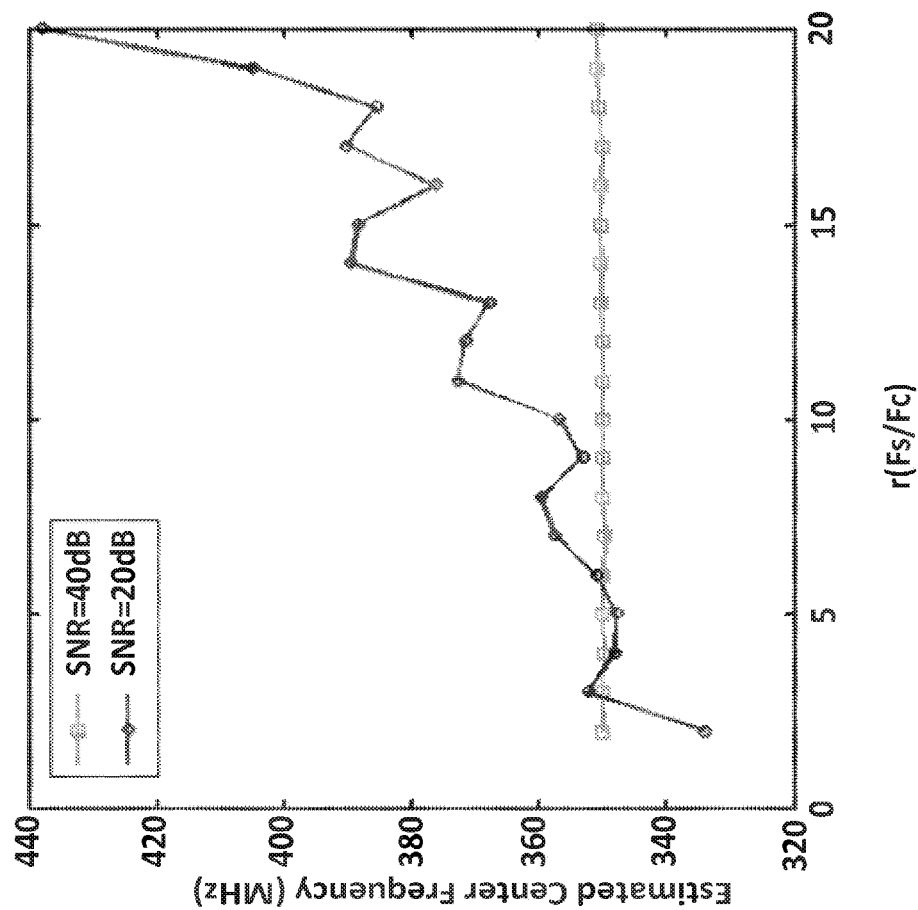
FIG. 18 is a graph that shows an estimated center frequency with different sampling rates.

FIG. 18 shows the estimated center frequency with different sampling rates. As shown in FIG. 18, the sampling rate may increase as the SNR decreases. The estimated center frequency shown in FIG. 18 may be between 320 MHz and 440 MHz. The sampling rate may be between 0 and 20, where the sampling rate may be measured in sampling frequency (Fs) over carrier frequency (Fc). For higher SNR, such as a 40 dB SNR for example, the sampling rate may not affect the estimated center frequency, or may affect the estimated center frequency very little. For a lower SNR, such as a 20 dB SNR for example, the optimum sampling frequency may be approximately 4 times the center frequency.

Figure 19:
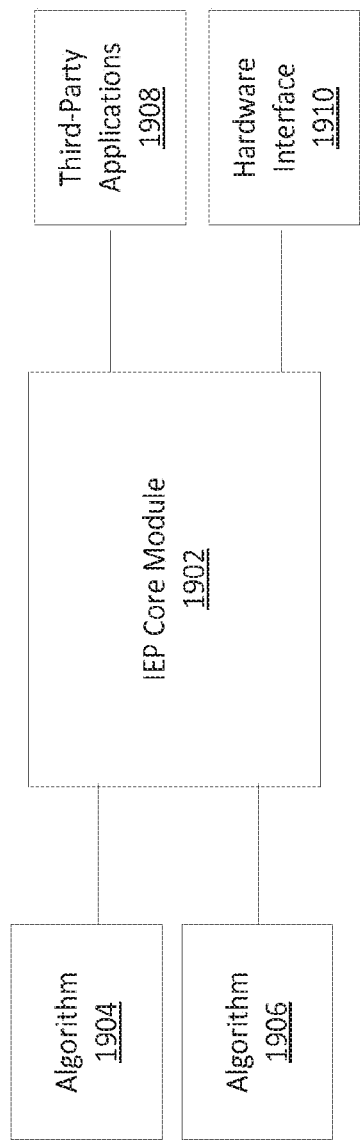
FIG. 19 is a block diagram that depicts an example of an open source model core.

The IEP may be implemented using one or more algorithms and/or modules. FIG. 19 is a diagram showing example modules that may be implemented by the IEP. For example, the IEP may include an IEP core module 1902. The IEP core module 1902 may be implemented on a processor or other control device. The IEP core module 1902 may be implemented as an open source model core that may execute open source code or other instructions.

The IEP core module 1902 may access one or more local or remote modules to perform one or more functions described herein. For example, the IEP core module 1902 may access one or more algorithms 1904, 1906 for performing interference estimation for a remote interference signal. The IEP core module 1902 may access third party applications 1908 for performing interference estimation for a remote interference signal. The IEP core module 1902 may be implemented by the IEP to interact with the algorithms and/or modules. As the IEP may be implemented using multiple algorithms and/or modules, the IEP core module 1902 may be implemented by the IEP to interact with the algorithms and/or modules. For example, FIG. 19 illustrates an open source model core 1902 that may interact with the algorithms and/or their corresponding modules.

The open source model core 1902 may be used to evaluate the scenario in which the IEP may be implemented (e.g., including the received signals) and may determine the most appropriate interference synthesis algorithm to use for the given scenario. The open source model core may also interface with other hardware via a hardware interface 1910 and/or third party applications 1908.

The IEP may estimate the interfering signal by exploiting temporal diversity and/or spatial diversity. Where the SOI bandwidth is wider than that of the interferer and/or the interferer power is greater than the part of the signal within the interferer's frequency spectrum band, such as where the power of the interferer is higher than that of the signal within their overlapping spectrum band, temporal diversity may be used to isolate the interference signal.

A signal may be received that includes a mix of the SOI and the interference. An instantaneous amplitude and/or instantaneous frequency may be determined from the received signal. An algorithm may be used to synthesize the interferer's copy of the signal. Once the interference algorithm is determined, the interference may be removed using the ICS (e.g., IRP).

In one example of a temporal interference synthesis algorithm, the wideband signal s(t) may be interfered with the narrowband signal n(t) of higher power spectral density. The wideband signal may be represented as a signal with spectral power density 1/B and bandwidth B $$s(t) = \frac{1}{B} \cdot \int_{\omega=0}^{B}\cos(\omega \cdot t)d\omega = \frac{\sin(B \cdot t - \pi)}{B} \quad \text{Equation (12)}$$

The instantaneous amplitude of the clean signal may be represented as:

$$a(s(t)) = \sqrt{s(t)^2 + \left(\frac{1}{\pi}\int_{\tau=-\infty}^{\infty}\frac{s(\tau)}{t-\tau}d\tau\right)^2} = \frac{1}{B} \quad \text{Equation (13)}$$

The instantaneous phase of the clean signal may be represented as:

$$\varphi(s(t)) = \operatorname{atan} \frac{\frac{1}{\pi} \int_{\tau=-\infty}^{\infty} \frac{s(\tau)}{t-\tau} d\tau}{s(t)} = B \cdot t - \pi \qquad \text{Equation (14)}$$

Instantaneous frequency may be a differential of the instantaneous phase:

$$\omega(s(t)) = \frac{d\varphi(s(t))}{dt} = B \qquad \text{Equation (15)}$$

The narrowband noise may be represented as a signal with spectral power density B and bandwidth 1/B:

$$n(t) = B \cdot \int_{\omega=0}^{\frac{1}{B}} \cos(\omega \cdot t) d\omega = B \cdot \sin\left(\frac{1}{B} \cdot t - \pi\right) \qquad \text{Equation (16)}$$

The instantaneous amplitude of the noise may be represented as:

$$a(n(t)) = \sqrt{n(t)^2 + \left(\frac{1}{\pi} \int_{\tau=-\infty}^{\infty} \frac{n(\tau)}{t-\tau} d\tau\right)^2} = B \qquad \text{Equation (17)}$$

The instantaneous phase of the noise signal may be represented as:

$$\varphi(n(t)) = \operatorname{atan} \frac{\frac{1}{\pi} \int_{\tau=-\infty}^{\infty} \frac{n(\tau)}{t-\tau} d\tau}{n(t)} = \frac{t}{B} - \pi \qquad \text{Equation (18)}$$

Instantaneous frequency may be a differential of the instantaneous phase:

$$\omega(n(t)) = \frac{d\varphi(n(t))}{dt} = \frac{1}{B} \qquad \text{Equation (19)}$$

The mix of the signal s(t) and noise n(t) may have the following instantaneous amplitude, phase and frequency:

$$a(t) = \sqrt{a(s(t))^2 + a(n(t))^2} = \sqrt{\frac{1}{B^2} + B^2} \approx B \qquad \text{Equation (20)}$$

$$\varphi(t) = \operatorname{atan} \frac{\frac{1}{\pi} \int_{\tau=-\infty}^{\infty} \frac{s(\tau) + n(\tau)}{t-\tau} dt}{s(t) + n(\tau)} =$$

$$\operatorname{atan} \frac{\sin\left(\frac{t}{B} - \frac{\pi}{2}\right) + \frac{\sin\left(B \cdot t - \frac{\pi}{2}\right)}{B^2}}{\cos\left(\frac{t}{B} - \frac{\pi}{2}\right) + \frac{\cos\left(B \cdot t - \frac{\pi}{2}\right)}{B^2}} \approx \frac{t}{B} - \frac{\pi}{2} \qquad \text{Equation (21)}$$

From equations (20) and (21), it is illustrated that the instantaneous amplitude and phase of the mix of narrowband noise and wideband signal may be closer to those of the narrowband noise, even though the power of both signals may be the same. Therefore, a cleaner signal may be obtained by subtracting the reconstructed signal:

$$r(t) = a(t) \cdot \sin(\varphi(t)) \qquad \text{Equation (22)}$$

from the mix of the SOI s(t) in Equation (12) and the noise n(t) in Equation (16).

Spatial diversity may be utilized where the strength of the interference may not be substantially stronger (e.g., about 10 times stronger) than the interference and the SOI and the interference may originate from different locations. When no prior knowledge about the coding scheme and/or signal spectrum may be available, but recovery of the original signals from the interfering signal may be desired, the problem may be referred to as blind source separation. One method for addressing blind source separation may be to use independent component analysis (ICA). Each of the transmitted signals may be incident upon a receiving array of antennas and may be mixed through propagation. The detected signal mixtures may be available to the ICA processor. The processor may use statistical independence to recover the original signals from the mixtures to within an arbitrary constant. The ICA may make the minimum number of assumptions to recover the original signals. These assumptions may be the original signals, si(t) may be independent, and/or one signal may be Gaussian distributed.

Figure 20:
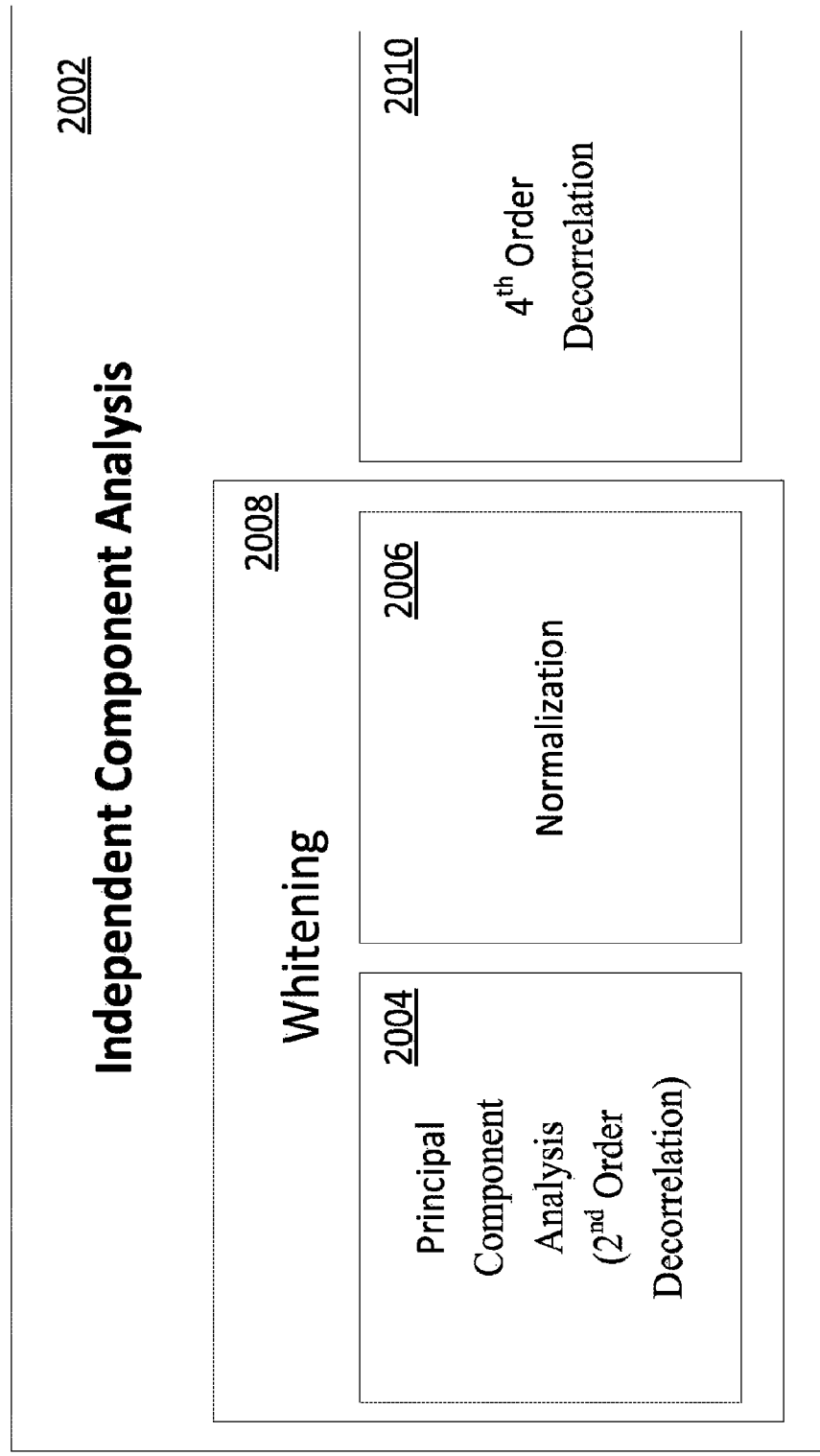
FIG. 20 is a block diagram that depicts an example ICA synthesis algorithm.

FIG. 20 illustrates a block diagram of an ICA synthesis algorithm, which may be implemented by an ICA module 2002. As shown in FIG. 20, a second order decorrelation may be performed at a principal component analysis (PCA) module 2004. The second-order decorrelation may be given by:

$$[s1s2]=[s1][s2], \qquad \text{Equation (23)}$$

where s1 may be a first signal source and s2 may be a second signal source present. This decorrelation may be performed in various ways, which may include eigenvalue decomposition, singular value decomposition, and/or PCA. Each of these techniques may orthogonalize the received mixtures with the amplitude weighted by the appropriate eigenvalue. PCA 2004 may be one technique for performing the second-order decorrelation step such that the mixtures lie along the directions of maximum variance. PCA 2004 may be used to decrease the dimensionality of a multi-dimensional data set by considering eigenvectors (e.g., directions of variance) above a minimum value.

Once the received mixtures have been orthogonalized, they may be normalized to equal length at the normalization module 2006. Together, the second-order decorrelation and normalization may be referred to as whitening and may be included in whitening module 2008. The spectral whitening may be a transformation of correlated signals to an uncorrelated flat spectrum signal.

A fourth-order decorrelation may be performed at a fourth-order decorrelation module 2010 to recover the original signals. For example, the fourth-order decorrelation may be given by:

$$[s_1^1 s_3^3] = [s_1^1][s_3^3] \qquad \text{Equation (24)}$$

$$[s_1^2 s_3^2] = [s_1^2][s_3^2] \qquad \text{Equation (25)}$$

$$[s_1^3 s_3^1] = [s_1^3][s_3^1] \qquad \text{Equation (26)}$$

where s3 may be a third signal source present.

Although features and elements are described above in particular combinations, each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, terminal, base station, RNC, or any host computer.

What is claimed:

1. An interference cancellation system (ICS) comprising:
an interference estimation processor configured to generate an estimated interference signal using a spatial diversity interference estimation technique based on one or more signals received over the air via an antenna array, wherein the spatial diversity interference estimation technique comprises an independent component analysis of interference signal components received via the antenna array, and the independent component analysis comprises a second order decorrelation of the interference signal components received via the antenna array; and
an interference cancellation processor configured to:
receive the estimated interference signal and a combined signal, wherein the combined signal comprises a combination of the interference signal and a signal of interest (SOI),
convert the estimated interference signal and the combined signal to optical signals,
apply a 180 degree phase shift to one of the estimated interference signal or the combined signal,
variably attenuate and variably time delay one or more of the estimated interference signal or the combined signal,
combine the estimated interference signal and the combined signal, and
convert the combination of the estimated interference signal and the combined signal into a radio frequency (RF) signal.

2. The ICS according to claim 1, wherein the interference estimation processor is configured to utilize a time diversity interference estimation technique to generate a second estimated interference signal.

3. The ICS according to claim 2, wherein the second estimated interference signal corresponds to a narrowband signal with and the SOI corresponds to a wideband signal, and the narrowband interference signal is within the bandwidth of the wideband SOI.

4. The ICS according to claim 1, wherein the interference estimation processor is configured to perform the independent component analysis by normalizing the interference signal components after performing the second order decorrelation.

5. The ICS according to claim 1, wherein the interference cancellation processor is further configured to:
determine whether the interference signal has been cancelled from the RF signal such that any remaining portions of the interference signal within the RF signal are below a threshold based on measuring a power level of the RF signal; and
cancel at least one other portion of the interference signal based on another estimated interference signal.

6. A method comprising:
generating an estimated interference signal using a spatial diversity interference estimation technique based on one or more signals received over the air via an antenna array, wherein the spatial diversity interference estimation technique comprises performing an independent component analysis of interference signal components received via the antenna array, and performing the independent component analysis comprises performing a second order decorrelation of the interference signal components;
receiving a combined signal, wherein the combined signal comprises a combination of the interference signal and a signal of interest (SOI);
converting the estimated interference signal and the combined signal to optical signals;
applying a 180 degree phase shift to one of the estimated interference signal or the combined signal;
variably attenuating and variably time delaying one or more of the estimated interference signal or the combined signal;
combining the estimated interference signal and the combined signal; and
converting the combination of the estimated interference signal and the combined signal into a radio frequency (RF) signal.

7. The method according to claim 6, wherein a time diversity interference estimation technique is used to generate a second estimated interference signal.

8. The method according to claim 7, wherein the second estimated interference signal corresponds to a narrowband signal with and the SOI corresponds to a wideband signal, and the narrowband interference signal is within the bandwidth of the wideband SOI.

9. The method according to claim 6, wherein performing the independent component analysis comprises normalizing the interference signal components after performing the second order decorrelation.

10. The method according to claim 6, further comprising:
determining whether the interference signal has been cancelled from the RF signal such that any remaining portions of the interference signal within the RF signal are below a threshold based on measuring a power level of the RF signal; and
cancelling at least one other portion of the interference signal based on another estimated interference signal received.

11. An interference cancellation system (ICS) comprising processor circuitry configured to:
generate an estimated interference signal using a spatial diversity interference estimation technique based on one or more signals received over the air via an antenna array, wherein the spatial diversity interference estimation technique comprises performing an independent component analysis of interference signal components received via the antenna array, and performing the independent component analysis comprises performing a second order decorrelation of the interference signal components;
receive a combined signal, wherein the combined signal comprises a combination of the interference signal and a signal of interest (SOI);
convert the estimated interference signal and the combined signal to optical signals;
apply a 180 degree phase shift to one of the estimated interference signal or the combined signal;

variably attenuate and variably time delay one or more of the estimated interference signal or the combined signal;

combine the estimated interference signal and the combined signal; and convert the combination of the estimated interference signal and the combined signal into a radio frequency (RF) signal.

12. The ICS according to claim 11, wherein the processor circuitry is configured to utilize a time diversity interference estimation technique to generate a second estimated interference signal.

13. The ICS according to claim 11, wherein the processor circuitry is further configured to:

determine whether the interference signal has been cancelled from the RF signal such that any remaining portions of the interference signal within the RF signal are below a threshold based on measuring a power level of the RF signal; and cancel at least one other portion of the interference signal based on another estimated interference signal.

* * * * *